US007778900B2

(12) United States Patent
Soumokil

(10) Patent No.: US 7,778,900 B2
(45) Date of Patent: Aug. 17, 2010

(54) METHOD AND SOFTWARE APPLICATION FOR COMPUTER-AIDED CASH COLLECTION

(75) Inventor: Mike Soumokil, Vught (NL)

(73) Assignee: SAP AG, Walldorf (DE)

( * ) Notice: Subject to any disclaimer, the term of this patent is extended or adjusted under 35 U.S.C. 154(b) by 1080 days.

(21) Appl. No.: 10/938,616

(22) Filed: Sep. 13, 2004

(65) Prior Publication Data

US 2005/0091158 A1    Apr. 28, 2005

Related U.S. Application Data

(60) Provisional application No. 60/512,296, filed on Oct. 16, 2003.

(51) Int. Cl.
*G06Q 40/00* (2006.01)
(52) U.S. Cl. .............................. 705/35; 705/38; 705/36; 715/236
(58) Field of Classification Search .................... 705/35
See application file for complete search history.

(56) References Cited

U.S. PATENT DOCUMENTS

| | | | | |
|---|---|---|---|---|
| 5,133,075 A * | 7/1992 | Risch | ......................... | 707/201 |
| 6,199,160 B1 * | 3/2001 | Echensperger et al. | ...... | 713/100 |
| 6,424,951 B1 * | 7/2002 | Shurling et al. | ............... | 705/14 |
| 6,487,556 B1 * | 11/2002 | Downs et al. | ............... | 707/101 |
| 6,798,413 B1 * | 9/2004 | Tracey et al. | ............... | 345/440 |
| 6,928,411 B1 * | 8/2005 | Fox et al. | ....................... | 705/1 |
| 6,996,542 B1 * | 2/2006 | Landry | ........................ | 705/40 |
| 7,003,766 B1 * | 2/2006 | Hong | .......................... | 717/144 |
| 7,191,150 B1 * | 3/2007 | Shao et al. | ..................... | 705/38 |
| 7,210,106 B1 * | 4/2007 | Delnoij et al. | .............. | 715/810 |
| 7,254,558 B2 * | 8/2007 | Hinkle et al. | ................. | 705/40 |
| 7,403,923 B2 * | 7/2008 | Elliott et al. | ................. | 705/38 |
| 2001/0051914 A1 * | 12/2001 | Yoon et al. | .................... | 705/38 |
| 2002/0082990 A1 * | 6/2002 | Jones | .......................... | 705/40 |
| 2003/0018634 A1 * | 1/2003 | Shringeri et al. | ............... | 707/4 |
| 2003/0130936 A1 * | 7/2003 | Reynolds | ..................... | 705/38 |
| 2003/0130937 A1 * | 7/2003 | Reynolds | ..................... | 705/39 |
| 2003/0135461 A1 * | 7/2003 | Brown et al. | .................. | 705/40 |
| 2003/0221165 A1 * | 11/2003 | Young et al. | ................ | 715/505 |
| 2007/0043661 A1 * | 2/2007 | Kass et al. | .................... | 705/38 |
| 2008/0010188 A1 * | 1/2008 | Beardsell et al. | ............. | 705/38 |

OTHER PUBLICATIONS

Business Policy Letter—Student Account Receivables Write-Off, Oct. 2003.(ONot.).*

(Continued)

*Primary Examiner*—Ella Colbert
*Assistant Examiner*—Chika Ojiaku
(74) *Attorney, Agent, or Firm*—Finnegan, Henderson, Farabow, Garrett & Dunner LLP

(57) ABSTRACT

Methods, computer systems, and computer-readable media describe the computerized processing of invoices. Invoices having a balance larger or smaller than preselectable values are selected from a plurality of invoices presented to two or more customers. It is determined whether payments according to the selected invoices have been made before or at the time of selection, and invoices that have been partially paid or not paid are automatically presented to a collector or collection specialist.

59 Claims, 5 Drawing Sheets

OTHER PUBLICATIONS

Bruce Hallberg, Sherry Kinkoph; Bill Ray,—et al., Special Edition, Using Microsoft Excel 97, Bestseller Edition, Oct. 1997 (Excel97).*

University of Wisconsin Colletions and Write-offs (F39), Revised Jun. 19, 1998 (RtOff2).* st-www.cs.illinois.edu/users/johnson/business.../fahey.html; Business Transaction Processing Systems—Position Paper, Jan. 31, 2001 (WkFlow).*

David L. March, IT-532—Systems Analysis—Oct. 2002 (FlowChart).*

* cited by examiner

METHOD AND SOFTWARE APPLICATION FOR COMPUTER-AIDED CASH COLLECTION

RELATED APPLICATIONS

This application claims the benefit of priority under 35 U.S.C. §119(e) from U.S. Provisional Patent Application No. 60/512,296, filed Oct. 16, 2003, which is expressly incorporated herein by reference.

BACKGROUND OF THE INVENTION

This invention relates to electronic data processing and, more particularly, to methods, data structures, computer program products and systems for automated processing of invoices.

There exist many known methods and systems for electronic processing of invoices based on electronic data records. Corporations and other entities use electronic data records and enterprise business software to store the financial data related to all aspects of a company's business including, for example, sales of product, and use of such data for a variety of purposes including, for example, credit and risk management. Although such data is stored and processed electronically with many electronic accounting systems, it is often not possible to accurately tell which invoices have been paid, which are being disputed, or whether there are other issues that will prevent payment of an invoice. Consequently, any analysis of the financial situation of an enterprise based on this uncertain invoice data may be misleading and show a financial situation of the enterprise that is different from the real financial situation. Further, the enterprise may not be aware of the need to collect the cash from active debts and, even if the company is aware, it may not be clear upon which parts of the outstanding invoices the efforts of cash collecting should be focused. This is particularly a problem in instances where a large number of invoices have been sent to many customers.

Thus, there is a need for a method, software application, and/or data processing system providing a more efficient solution to the problems described above. In particular, it would be desirable to provide a software application having a mechanism for enabling better processing of invoices to make collections more easily managed according to the company's active debts from customers.

SUMMARY OF THE INVENTION

In accordance with the invention, as broadly described herein, embodiments of methods and systems consistent with the principles of the invention provide a method of computerized processing of invoices comprising steps of: selecting from a plurality of invoices presented to two or more customers, invoices having a balance larger than a preselectable first value, determining whether payments according to the selected invoices have been made before or at the time of selection, and presenting to a collector invoices wherein conditions of partial payment and non-payment have occurred.

An additional aspect of another implementation of the above method is to provide a computer system for the computerized processing of invoices, the system comprising: memory having program instructions; input means for receiving and entering data; output means for sending and presenting data; storage means for storing data; and a processor responsive to the program instructions, the program instructions enabling: selecting from a plurality of invoices presented to two or more customers, invoices having a balance larger than a preselectable first value (sometimes "step a)" as discussed below), determining whether payments according to the selected invoices have been made before or at the time of selection ("step b)"), and presenting to a collector invoices wherein conditions of partial payment and non-payment have occurred ("step c)").

Certain embodiments of the present invention facilitate the collection of outstanding cash independent of a specific customer. Using methods consistent with the present invention, a company can identify invoices most at risk for nonpayment and target such invoices for cash collection. Certain embodiments of the present invention provide an overview of critical invoices well before the respective due dates, so that measures to ensure punctual payment can be taken in good time. Further, certain embodiments of the invention may improve record keeping of outstanding day sales via management of liquidity, and credit risk management via increased transparency. Certain embodiments may also allow for better customer profiling through company-owned credit scores, better reporting of accounts receivable, and better communication with customers.

Embodiments of the invention are further directed to a computer system, a computer program, a computer-readable medium and a carrier signal, each comprising program code or instructions for computerized processing of invoices, according to the above method and related embodiments.

Such computer program can be installed as one or more programs or program modules on different hardware systems (e.g., drives, computers, computer systems, etc.), potentially run separately and independently of each other, and in their entirety being capable of performing the inventive method and its embodiments. The different systems may be connected in any variety of manners, such as via a computer network, to communicate with each other.

Additional objects and advantages of the various embodiments of the invention will be set forth in part in the description, or may be learned by practice of the invention. The objects and advantages of the embodiments of the invention will be realized and attained by means of the elements and combinations particularly pointed out in the appended claims. Embodiments of the invention are disclosed in the detailed description section and in the appended claims.

BRIEF DESCRIPTION OF THE DRAWINGS

The accompanying drawings, which are incorporated in and constitute a part of this disclosure, illustrate various embodiments and aspects of the invention. In the drawings.

DESCRIPTION OF THE EMBODIMENTS

Figure 1:
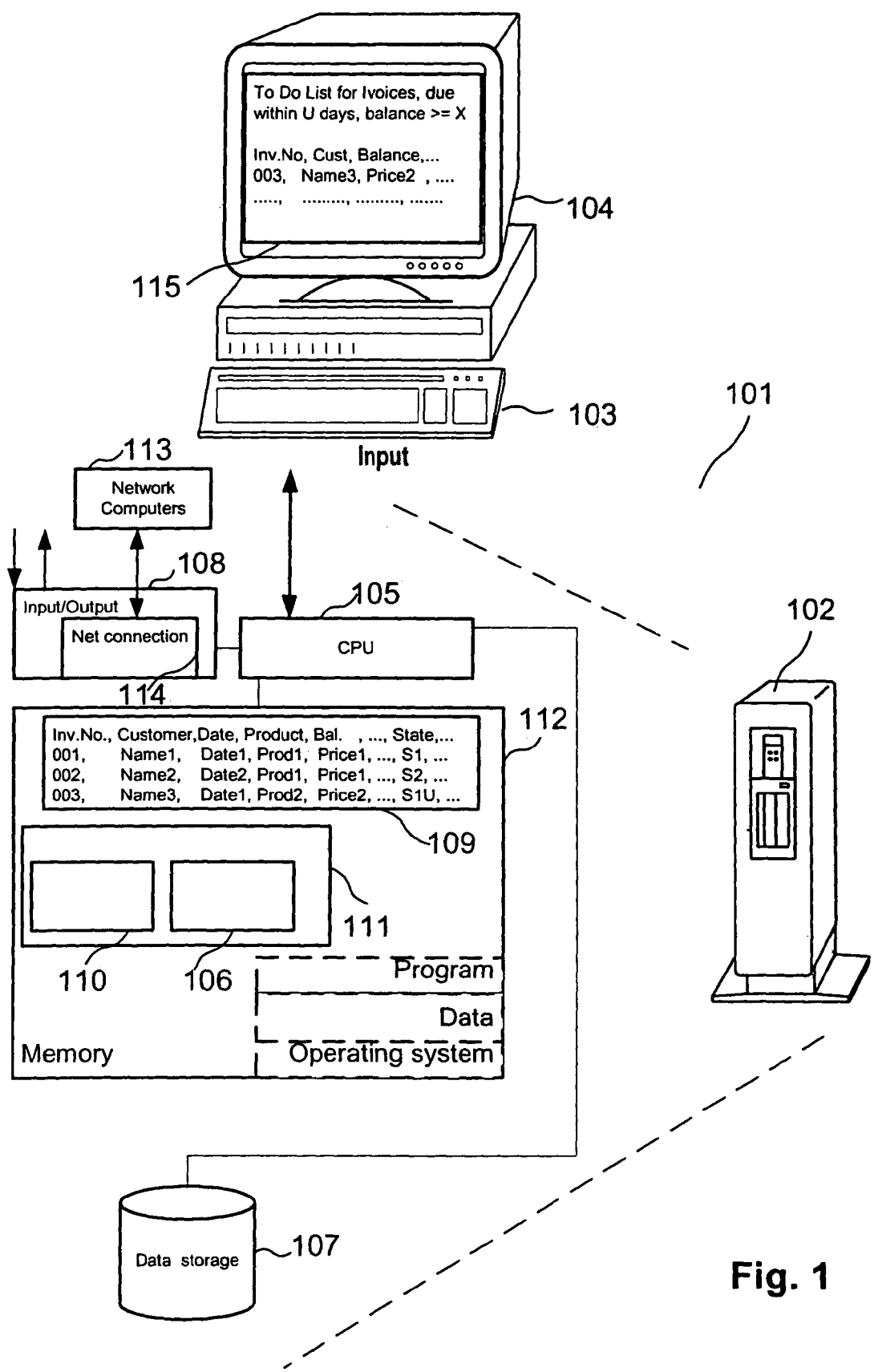
FIG. 1 illustrates an exemplary implementation of a method, by means of a computer system, according to an embodiment of the present invention.

Within the concept of this specification, the terms used shall have their usual meaning in the context of the field of data processing, unless defined otherwise herein.

A computer system broadly refers to any standalone computer such as a PC or a laptop or a series of computers connected via a network (e.g., an enterprise network within a company), or a series of computers connected via the Internet.

Computer systems and programs are closely related. As used herein, phrases, such as "the computer provides," "the program provides," "the program performs specific actions," and the like are used to express actions by a computer system that may be controlled by a program or to express that the program or program module may be designed to enable the computer system to perform the specific action or to enable a user to perform the specific action by means of a computer system.

It should be understood that the term "presentment" as used herein broadly refers to the specialized definition normally associated with commercial paper (i.e. the production on a negotiable instrument to a drawee), as well as to providing such information via electronic means (with or without the qualifier, "electronic"). For example, this electronic presentment may be through the use of an Internet-or intranet website, or via e-mail or text messaging, for example, by making a web site accessible to one or more persons. Electronic presentment may also take place by sending computer-readable storage media, like magnetic, magneto-optical or optical disks (e.g., floppy disks, storage tapes, CDs, DVDs, etc.) or other types of portable memory devices via standard mail, express courier or the like.

Reference will now be made in detail to the principles of the invention and its embodiments by an explanation of the data processing functionality, examples of which are illustrated in the accompanying drawings. Examples mentioned herein are for explanatory purpose only and are not meant to limit the invention in any manner whatsoever.

In electronic data processing, particularly in accounting processes, the content of invoices may be stored in electronic data records. Such data records may be implemented as one or more lines of one or more tables, each line having one or more fields. In object-orientated programming, for example, an electronic data record may be implemented by an instance of a class. The class can have a plurality of variables. The class can further have one or more functions, which are operable on the instances (e.g., invoices). The fields or variables contain typical invoice information such as name of customer, addresses, product, price, account number, payment terms, tax, contact person, invoice date, due date or person responsible for changes in the document on the customer side or responsible person for authorization. Of course other typical fields or variables may also be used and are intended to be within the scope of the invention.

The processes, such as those set forth herein, may be performed using such electronic data records. A set of such records may be queried, for example, to extract such records where the balance of the invoice is larger then a preselectable first value (for future reference, step a). The selected invoices may be stored as a separate set or marked as a selected set. In a further step (step b), it is determined, e.g. by the computer system, whether payments have been received for the selected invoices. Invoices for which no payments or only partial payments have been received are further selected, e.g. by storing them separately or marking them. Both steps a) and b) may be performed in reverse order or as a single query. In a third step (step c), the selected invoices with past due amounts are presented to a collector. A collector may be, for example, a caseworker of the company, an outside collection agent or agency, an electronic component responsible for collection, or a combination thereof. The term "collecting agency" broadly refers to collection divisions of the company seeking payment of invoices as well as to collecting agencies different from the company.

Presentation to the collector may be performed in a variety of ways. In one embodiment, the collector may be sent an e-mail including a file with the selected set of invoices. In certain other embodiments, the collector may be sent a link pointing to the storage location of such a file or be sent a link to a web page that contains the selected invoices and that may comprise further information like correspondence, notes, scanned letters, etc. The collector can then decide which further actions are to be performed. The collector may, for example, send an e-mail to the customer or call the customer directly via telephone. If the collector is an electronic system, the collector may automatically generate and send emails or automatically dial the customer using the telephone. If the customer is not at home, the collector may leave computerized voice messages indicating the status of the customer's invoice and requesting payment.

After presenting the selected invoices to the collector, the states of the invoices may be changed or updated accordingly. In certain embodiments, the invoice data may be updated based on information received by the collector, whether the collector is a person or an electronic system. It should also be noted that, for at least some of the embodiments described herein, the selection of invoices is independent of customer-specific information, thereby allowing customer-independent reporting.

As mentioned above, invoices may be "marked" to indicate that they are selected for further processing. In certain embodiments of the present invention, an invoice is represented by an electronic data record that may comprise a data field for such information as the amount of the balance, whether the invoice is partially paid or unpaid, a characterization of one or more of the payments, and the state of processing of the invoice. This field may be referred to as a state field. The state field may be implemented, for example, as a string field with a length of one or more characters, depending on the number of possible states. The following further states may also be characterized: cash collection, special attention, high priority, medium priority, low priority, problem indicators on contract issues or on invoice content and lay-out issues or on issues to be handled by responsible managers or on escalated matters, internal status, number of days outstanding, payment date of document. These states are examples only, as all states generally know in the art are contemplated, and are not intended to limit the scope of the invention.

A first embodiment of the inventive method is characterized in that the method further comprises in step a): selecting from the selected invoices such invoices, which are due within a preselectable time or on a preselectable date, before continuing with step b). As an example, invoices of high priority may be presented ten days before their due date, invoices of medium priority can be presented seven days before their due date, and low priority invoices can be presented on the due date. The mentioned values are examples only, specific values could be set by the company. Furthermore, instead of such priority-based ranking, the amount of the balance may be used as well.

A second embodiment of the inventive method is characterized in that the method further comprises in step a): selecting from the selected invoices such invoices, the due date of which has expired, before continuing with step b).

A third embodiment comprises, instead of or in addition to step a), step d): selecting from the plurality of invoices such invoices, the balance of which is smaller than a preselectable second value, and larger than a preselectable third value, the second value being smaller or equal than the first value and the third value being smaller than the second value, before continuing with step b).

A fourth embodiment comprises in step d): selecting from the selected invoices such invoices, which are due within a preselectable time or on a preselectable date. This is useful because it enables a company to efficiently check whether its invoices are paid in due time. For example, the collector may receive a list of invoices that are due in two days. The collector can now schedule time appropriately, because the collector knows how many and which invoices must be checked in two days.

A fifth embodiment is characterized by, instead of or in addition to step c), notifying (also dunning) the customers of the accompanying unselected due invoices. With this method, minor important invoices can be automatically processed, e.g. by automatically sending emails, personalized circular letters, and/or other mail.

A sixth embodiment is characterized by, in step c), presenting the selected invoices via a "things to do" list ("to do list").

The presentation of a to-do list may be accomplished by presenting the selected invoices in the form of a list on a display of the computer system of a caseworker. This can be done automatically or by sending a link to a file, that contains the list. The list may be provided with check boxes, alerts, or proposals for actions, each depending on the state of the respective invoice.

In a seventh embodiment, the method is characterized in that the preselectable first value is such that a preselectable first percentage of the outstanding turnover of the company is covered. The first percentage may range, for example, from approximately 70% to approximately 90%, depending on the intention or desire of the company. For example, 80% may be a useful value in a variety of cases. The actual number of the first value can, for example, be determined iteratively by successively increasing the first value from start value (0% being the trivial case) and checking within each step, which percentage of the turnover is covered, and taking that number as first value, the accompanying percentage of which equals the desired value of turnover.

An eighth embodiment is characterized in that the preselectable first, second and third values are such that a preselectable second percentage of the outstanding turnover of the company is covered. The second percentage may range, for example, from approximately 70% to approximately 100%, depending on the intention or desire of the company. The selection according to this embodiment is helps to ensure that unselected invoices represent only a comparatively small percentage (i.e., 100% minus the second percentage) of the company's turnover.

Another embodiment comprises, in step c), checking whether a partial-payment or non-payment is reasoned (or justified), and if not, presenting such unreasoned (or unjustified) partial-or non-paid invoices to a collector. After presenting the invoices to the collector, the states of the respective invoices may be changed accordingly.

A further embodiment of the inventive method comprises, in step c), presenting invoices that are not due at or before (i.e., by) a presetable first period of time prior to the due date to the collector.

A further embodiment of the inventive method comprises, in step d), presenting invoices that are not due by (i.e., at or before) a presetable second period of time prior to the due date to the collector.

A still further embodiment of the inventive method comprises, instead of or in addition to step a) and/or step d), selecting from the plurality of invoices the invoices with balances smaller than the third value.

A still further embodiment comprises, in step d), presenting the invoices at or before a presetable third period of time before the due date to the collector.

A still further embodiment comprises the collector determining whether payments according to the invoices have been made before, on or after the due date, and, in the case of a partial-or non-payment, presenting such invoices to a collector.

A still further embodiment comprises checking whether a partial-or non-payment is justified (or reasoned), and, if not, presenting such invoice to an external collecting agency.

A still further embodiment comprises presenting such invoices to a clearing division prior to presenting them to the external collecting agency. This may be useful, because it enables the company to negotiate new payment conditions with the customers before escalating the case to the collecting agency. In the event that new payment conditions have been agreed upon, the step of presenting to the collecting agency can be omitted.

The preselectable first, second and third values, times, dates and percentages can be stored in variables or tables and can be made editable by a user (e.g. a caseworker or a collector) via a user interface.

A still further embodiment of the inventive method is characterized in that the second period of time is smaller than the first period of time and the third period of time is smaller than the second period of time. In a still further embodiment, the collection agency can be a collection division of the company or an external collecting agency.

A first embodiment of the electronic data record is characterized in that the state field can contain one or more characters for the delineation or characterization of the state. The above-mentioned states may be entered into the state field by entering a characteristic character or combination characters into the field, e.g. S1 to Sn for the states 1 to n. For each condition mentioned above, a state can be assigned and entered into the state field. Likewise, a state can be assigned to combinations of two or more conditions.

A further embodiment of the electronic data record is characterized in that the data field can be linked to a table, which can contain a description of a state. For example, the following descriptions can be entered in that table: balance>=X, X>balance>=Y, high priority, special case, high priority AND balance>=X, due within U days, due on "date", and so on.

A further embodiment of the electronic data record is characterized in that the state field can be directly or indirectly linked to a table, which can contain one or more instructions, that depend on the state and which are automatically executable by a computer system, for example, automatically notifying/dunning customers.

A further embodiment of the electronic data record is characterized in that the state field can be directly or indirectly linked to a table, which contains data assigning the state to an event that might occur during the processing of the invoice. Representative events that might occur include: blocking an invoice from being paid because invoice lay-out is not complete, the invoice reference or other necessary information is missing, or quality or quantity issues on outstanding documents need to be solved by a responsible person within the company. These events are examples only and are not intended to limit the scope of this invention. By means of a table, one or more proposals for a change of the state delineation may be assigned to a state.

In a further embodiment, the electronic data record may comprise a field for comments. This field may be implemented, for example, as a string field of a length of up to 128 characters or more.

A further embodiment of the electronic data record is characterized in that the electronic data record is at least partially accessible via the Internet and wherein the content of the state field or a data field for comments is editable via the Internet. In order to achieve this, the respective data fields must be unblocked so as to allow read/write access in the computer system in which the electronic data record is processed. Other selected fields of the electronic data record, the content of which fields may be of interest for a potential Internet user, may be unblocked for read access only.

A further embodiment of the electronic data record is characterized in that the state field may be linked to a table that contains one or more state dependent proposals for changing the state. For example, if the state indicates that an invoice has to be paid in a few days, a proposed state change after the due date is that the state may be changed to "not paid". Or, for example, if a certain situation has been clarified by a phone call, the state may be changed to "will be paid with delay," to reflect the conversation with the customer.

A further embodiment of the data structures of the above-described methods is characterized in that the method further comprises a step of assigning a state, which may be entered by a user, to the state field. An independent program, which may collect all changes of states in a pre-definable time interval and then write the changes periodically into the respective state fields, may implement this assignment step.

A further embodiment of this method is characterized in that the method further comprises selecting, sorting, evaluating, or analyzing the electronic invoices according to the state.

By using this method and generally known database query tools, a user of the method (e.g. a collector) may get lists of all invoices that fulfill the various pre-definable conditions associated with the state field as indicated above.

A further embodiment comprises calling a state dependent work flow. By using this method, a workflow that is designed to solve a specific problem may be automatically initiated. For example, a dispute process can be initiated if a due invoice is not paid without a reasoned statement. Then, mail may be automatically sent to a collecting agency in order to solve the problem. Further, a deadline can be set on an outstanding problem. After the specified date, the system may automatically sent a reminder to the responsible persons to take action.

Further, a to-do list can be initiated for cash collectors on outstanding items and mail may be automatically sent to responsible contact people associated with the customers.

The disclosed methods, data structures, and computer systems may be used in or for an enterprise resource planning software. Enterprise resource planning software as used herein, broadly refers to any software or software package for supporting business processes of enterprises, including but not limited to accounting, administration, management, or production processes.

Processors suitable for the execution of a computer program include, by way of example, both general and special purpose microprocessors, and any one or more processors of any kind of digital computer. Generally, a processor will receive instructions and data from a read-only memory or a random access memory, or both. The essential elements of a computer are a processor for executing instructions and one or more memory devices for storing instructions and data. Generally, a computer will also include, or be operatively coupled to receive data from or transfer data to, or both, one or more mass storage devices (storage means) for storing data, e.g., magnetic, magneto-optical, or optical disks. Information carriers suitable for embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the invention can be implemented on a computer system having a display device such as a CRT (cathode ray tube) or LCD (liquid crystal display) monitor for displaying information to the user, and a keyboard and/or a pointing device, such as a mouse or a trackball, by which the user can provide input to the computer. Other kinds of devices can be used to provide for interaction with a user as well. For example, feedback provided to the user can be any form of sensory feedback, such as visual feedback, auditory feedback, or haptic feedback; and input from the user can be received in any form, including acoustic, speech, or haptic input.

The invention is now described in more detail by way of reference to the drawings. FIG. 1 shows one example of an implementation of an embodiment of the invention: a computer system with program modules for processing the inventive electronic data record and for performing the inventive method. What is shown is a computer system 101 comprising a computer 102 having a CPU 105, a memory 112 for storing an operating system, data and programs. In memory 112, a software application 111 is stored for being processed by CPU 105. Software application 111 comprises program modules 106, 110 for carrying out the processing of the inventive electronic data record and the processing according to the inventive method. The inventive electronic data records are implemented in a table 109 comprising columns for typical invoice data and at least one column for the state of the invoice. Table 109 is stored in computer memory 112 and/or on a data storage device 107. Computer system 101 further comprises input means 103, output means 104 for interaction with a user (e.g., for starting the program modules and/or for data input), and general input/output means 108, including a network connection 114 (e.g., wired, wireless, optical, etc.), for sending and receiving data. A plurality of computer systems 101 can be connected via the network connection 114 in the form of a network 113. In this case, the network computers 113 can be used as further input/output means, including the use as further storage locations. Computer system 101 further comprises storage means 107.

If software application 111 carries out the claimed method, CPU 105 may process program modules 106, 110. The processing comprises module 106 querying table 109 for invoices, which are due within U days and the balance of which is equal or greater than X. Module 106 enters a state S1U into the state field of the respective invoice(s), Inv. No. 3 in the example. Subsequently, module 110 queries table 109 for invoices having the state S1U, extracts preselectable data from the respective invoices, and presents the extracted date to a user in the form of a to-do-list 115 on a display 104. A user can evaluate the list and decide which actions should be performed next. In order to support this, the to-do-list may comprise check boxes or buttons by means of which further actions can be initiated. For example, a button assigned to each invoice may cause, when pressed or selected, an e-mail with a predefinable content to be sent to the customer of the respective invoice. The presenting of the to-do list can also be performed on other network computers 113 or the output means 104.

Figure 2:
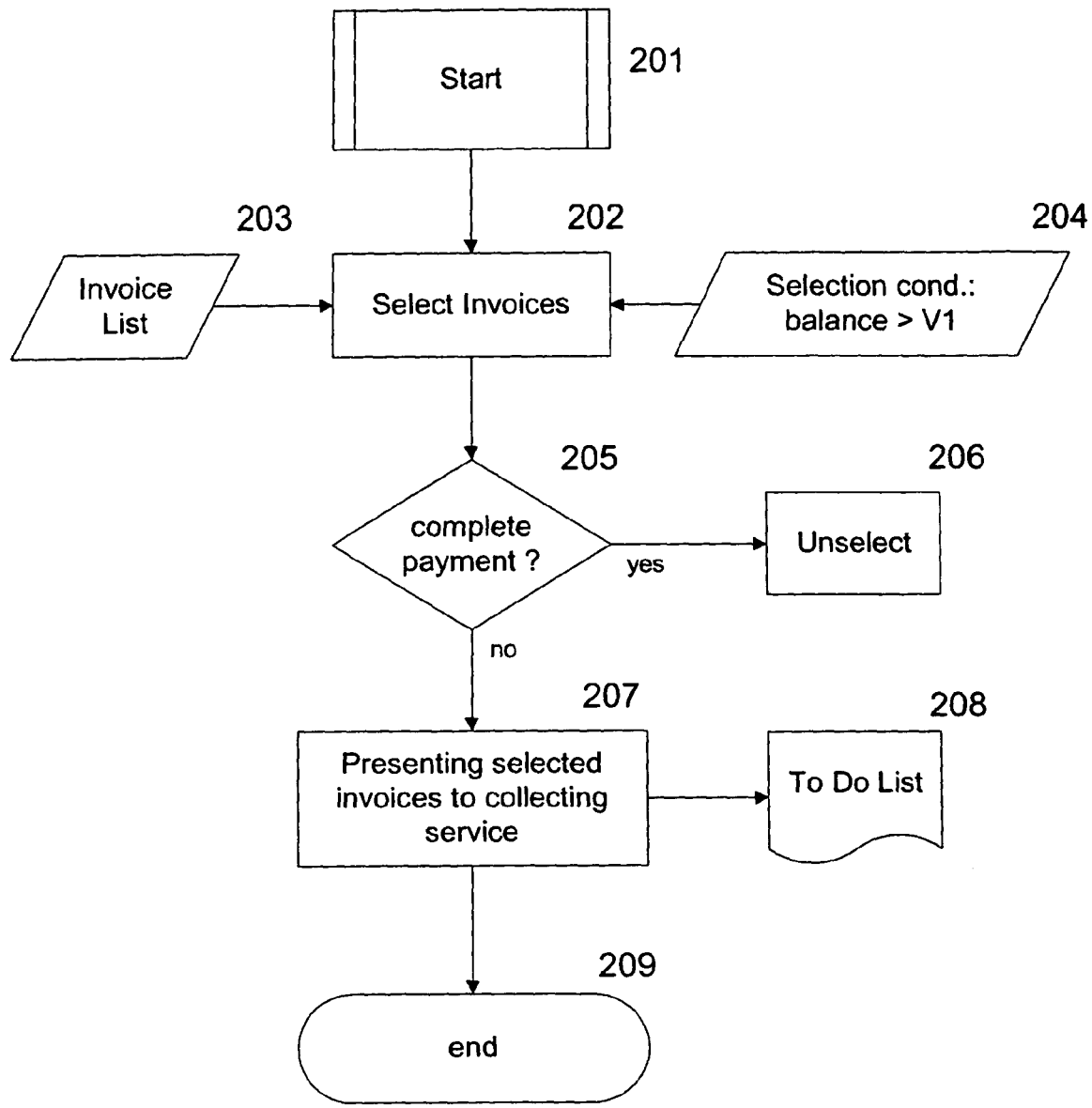
FIG. 2 illustrates a flow diagram of a first example of a method for processing invoices according to one embodiment of the principles described in this disclosure.

FIG. 2 shows an exemplary flow diagram illustrating principles of the disclosed methods, according to one or more embodiments of the present invention. After a start step 201, a list of invoices 203 is queried or selected in step 202 according to a set of selection conditions 204. In the illustrated example, the set consists of only one condition: The balance of an invoice has to be greater than a value V1. For the selected invoices, a further step 205 checks whether a payment (e.g., full payment) has been received. If complete payment has been received, the respective invoice is withdrawn from the list of selected invoices. In a further step, the state of the respective invoice may be changed to "paid". The invoices for which no payment or only a partial payment has been received are then presented as a to-do list 208 to a collector, e.g. a user in a collecting department of the company, as shown in step 207. This exemplary process then ends in step 209.

Figure 3:
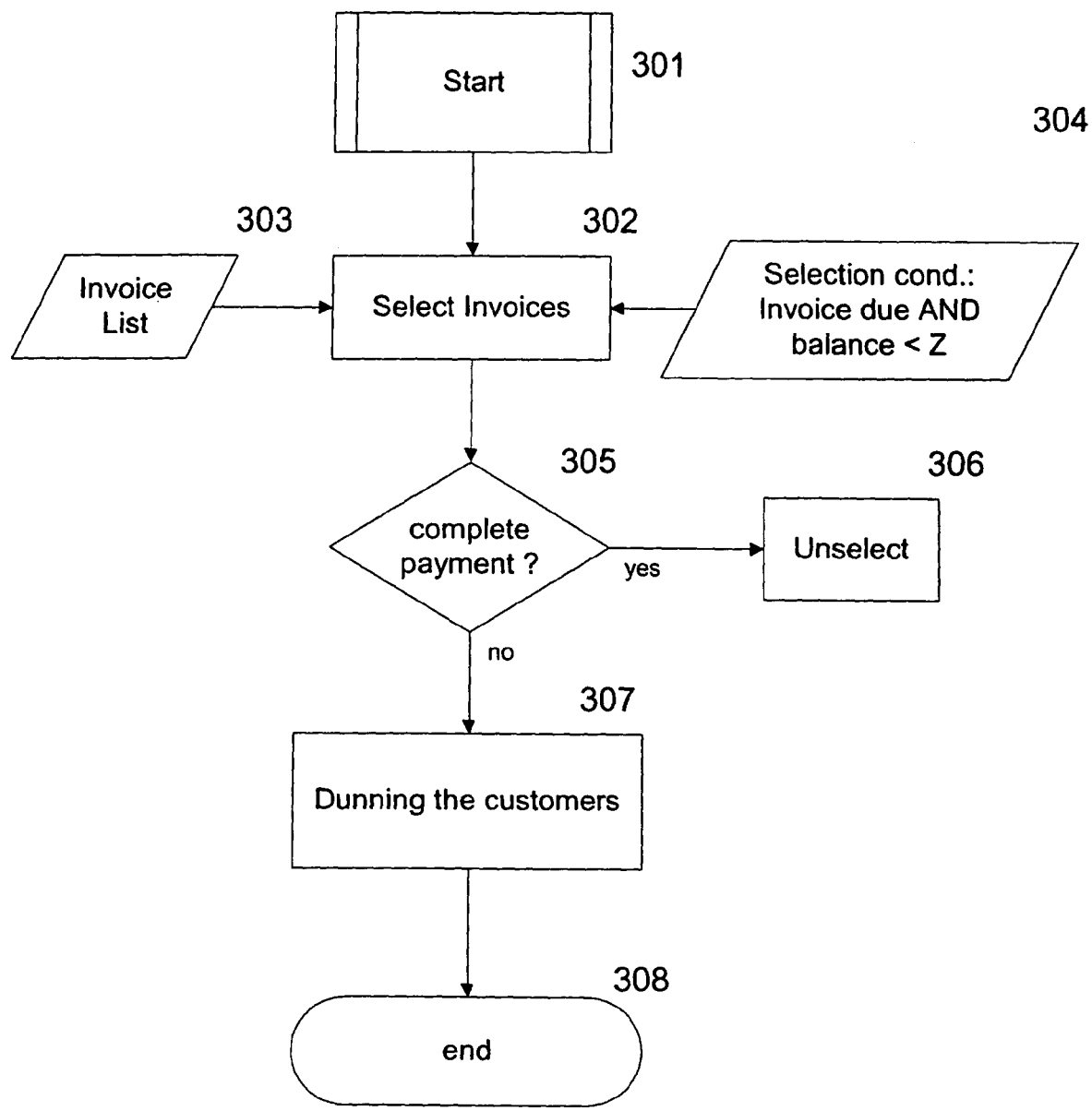
FIG. 3 illustrates a flow diagram of a second example of a method for processing invoices according to another embodiment of the principles described in this disclosure.

FIG. 3 shows a further exemplary flow diagram in order to further illustrate principles of the described method, according to one or more embodiments of the present invention. After a start step 301, a list of invoices 303 is queried in step 302 according to a set of selection conditions 304. In this example, the set consists of two conditions: first, the balance of an invoice must be smaller than a value Z, and, second, the invoice has to be due. The selected invoices are checked in step 305 to see whether full payment has been received. If so, the respective paid invoice can be withdrawn (or unselected) from the list of selected invoices by, for example, changing the state of the respective invoice to "paid". The customers associated with the invoices for which no payment or only a partial payment has been received are then automatically notified/dunned in step 307 (e.g., by automatically sending dunning letters or e-mails). Alternatively, the unsettled invoices may be presented as a to-do list 208 to a collector (e.g., a user in a collecting department of the company in order to confirm the dunning by the collector before the dunning letter or e-mail is sent out). This exemplary process then ends in step 3081

Figure 4:
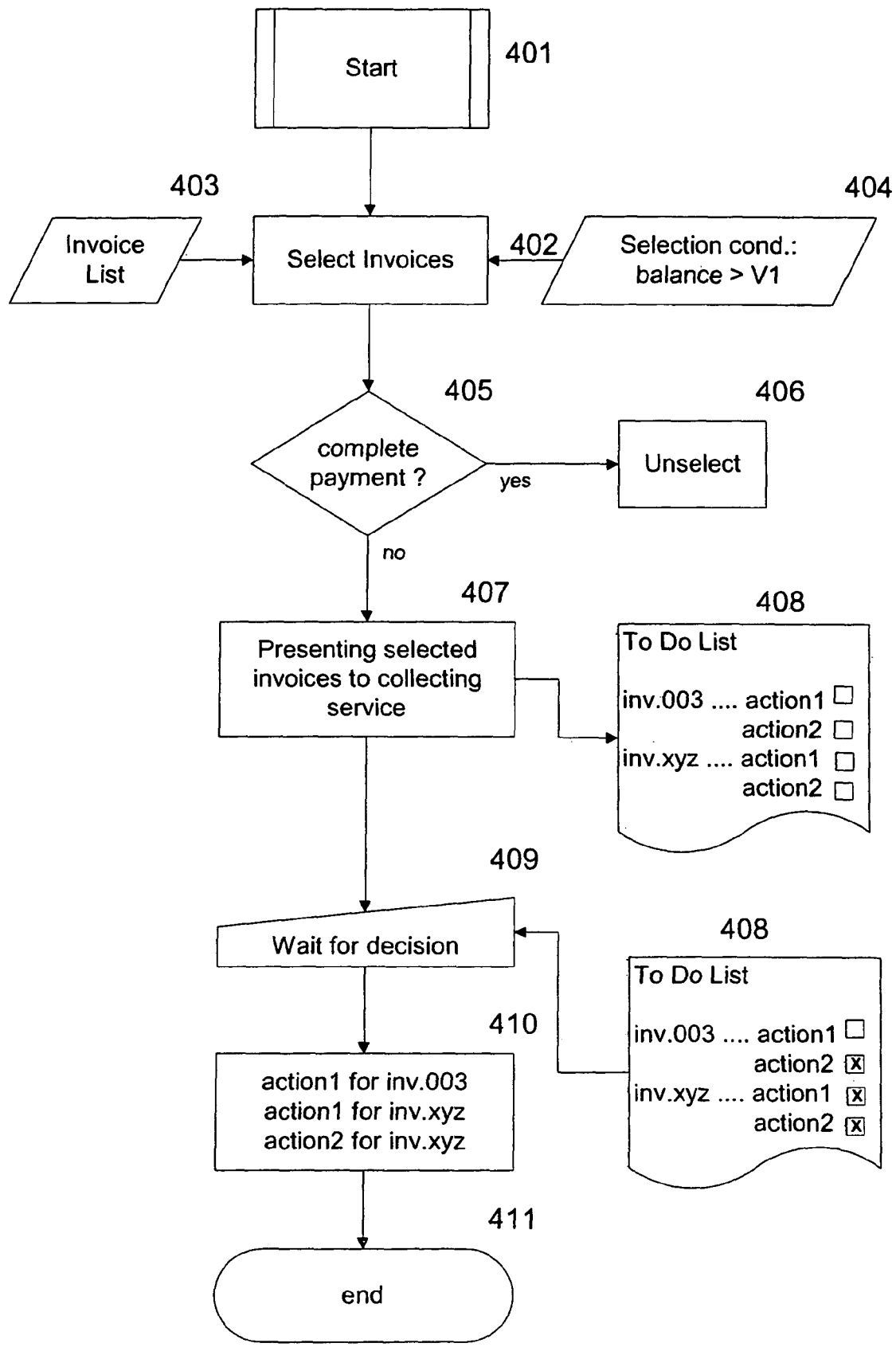
FIG. 4 illustrates a flow diagram of a third example of a method for processing invoices according to yet another embodiment of the principles described in this disclosure.

FIG. 4 shows an exemplary flow diagram that further illustrates principles of the described method, according to one or more embodiments of the present invention. After initiating the process in a start step 401, a list of invoices 403 is queried in step 402 according to a set of selection conditions 404. In the instant example, the set consists of only one condition: The balance of an invoice must be greater than a value V1. The selected invoices are checked in step 405 to see whether a full payment has been received. If so, the respective paid invoice can be withdrawn (or unselected) from the list of selected invoices by, for example, changing the state of the respective invoice to "paid". The invoices for which no payment or only a partial payment has been received are then presented as a to-do list 408 to a collector (e.g., a user in a collecting department of the company) in step 407. The collector can then decide which action has to taken next, for example, by selecting one of a list of proposed actions, which can be incorporated into the to-do list 408. In step 409, the process waits for that decision. The decided action is then automatically carried out in step 410. An example for such an action is: presenting the invoice to a in-house clearing division that could, for example, decide whether to present it to an external collecting agency. The exemplary process then ends in step 411.

Figure 5:
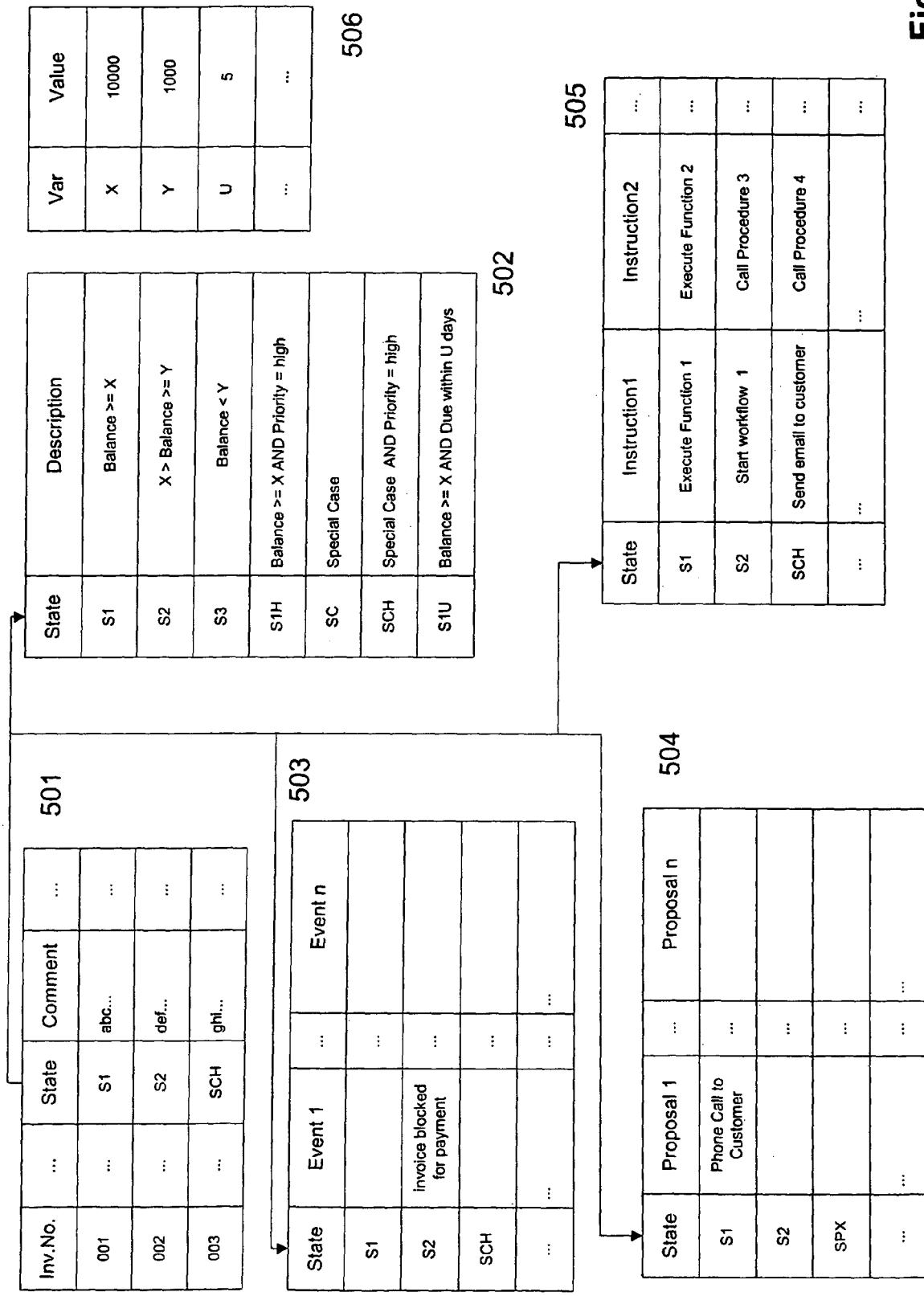
FIG. 5 illustrates a block diagram of an exemplary data structure for processing invoices according to one embodiment of the principles described in this disclosure.
Figure 1:
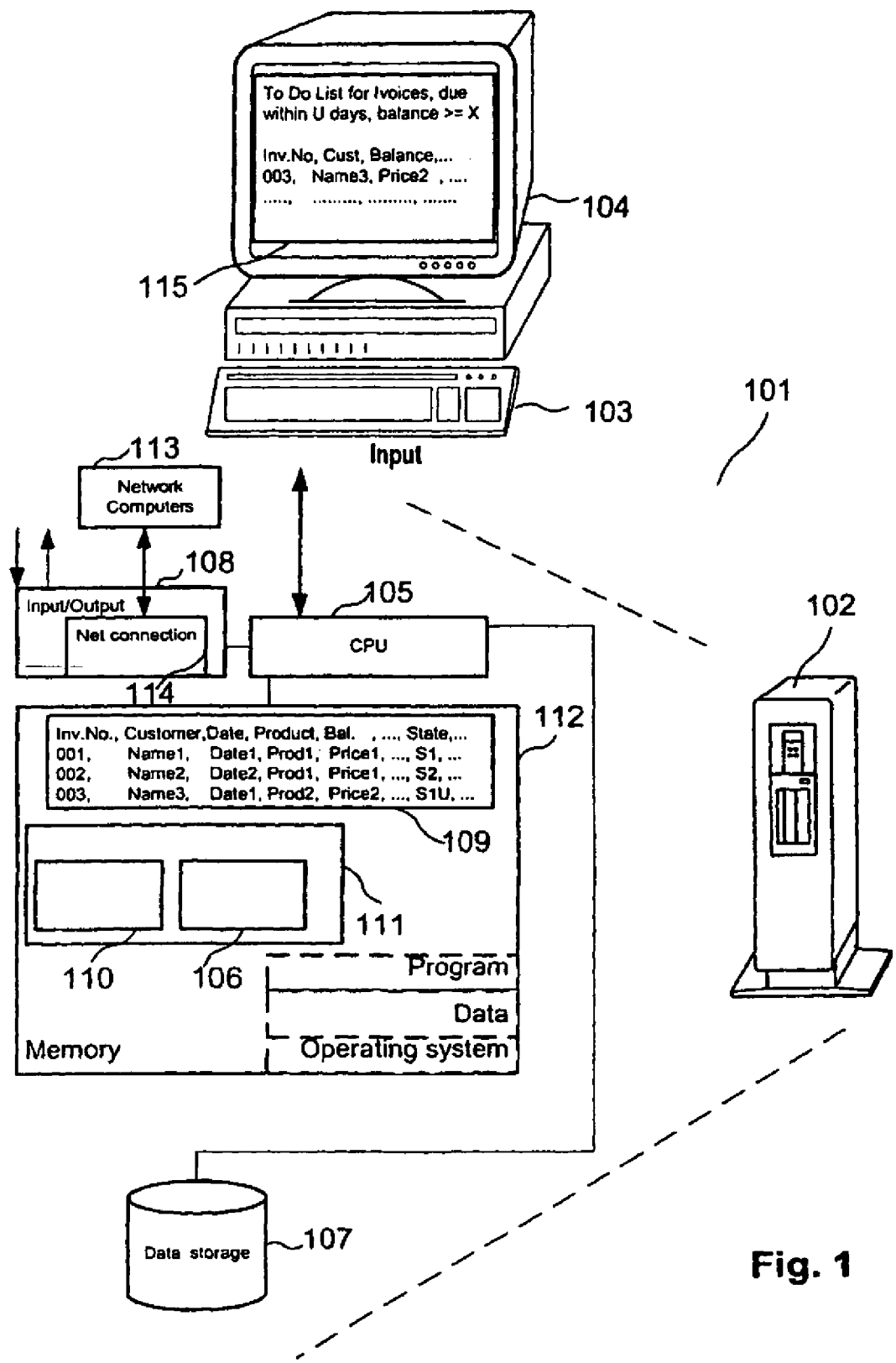
Figure 2:
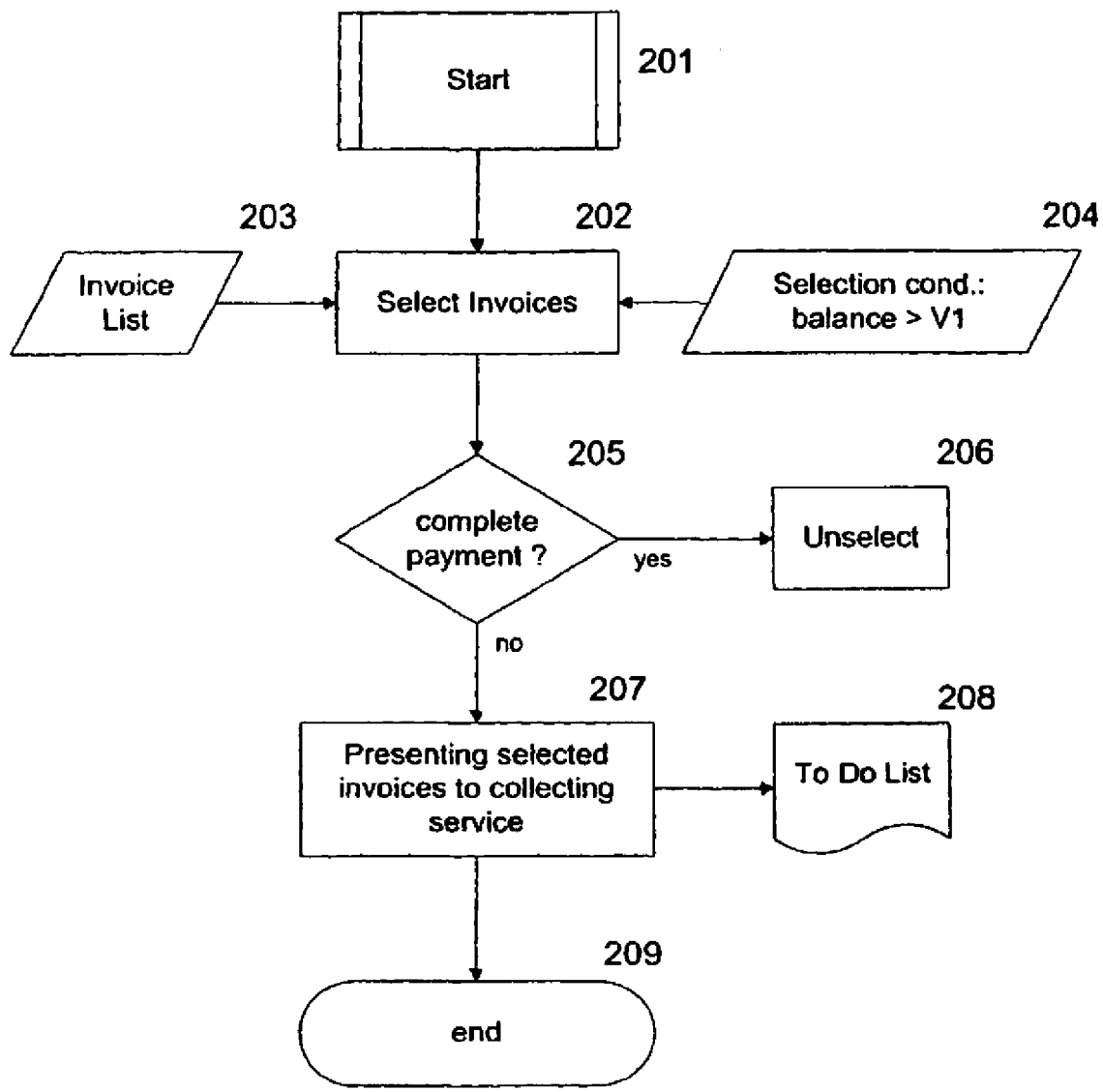
Figure 3:
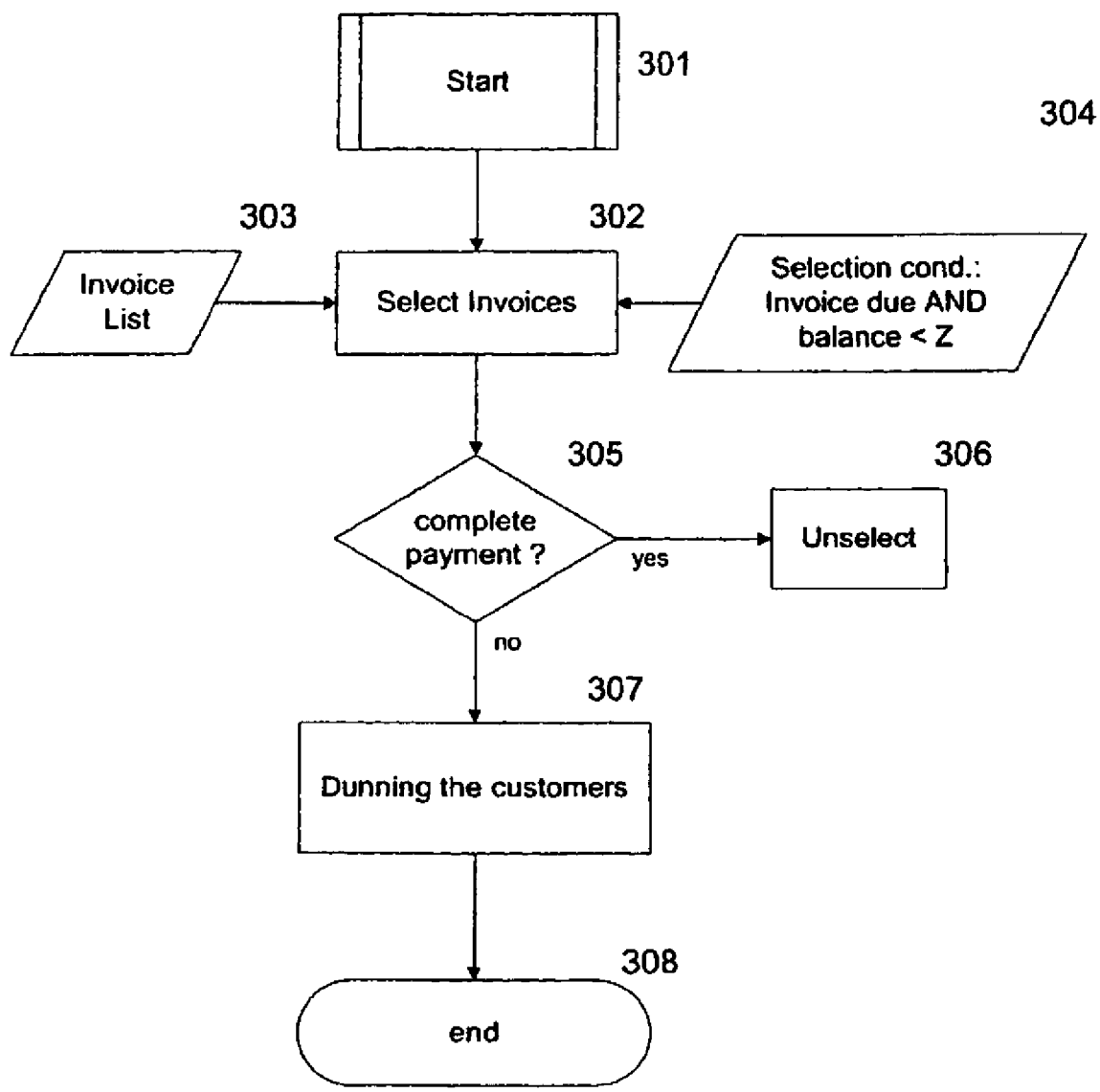
Figure 4:
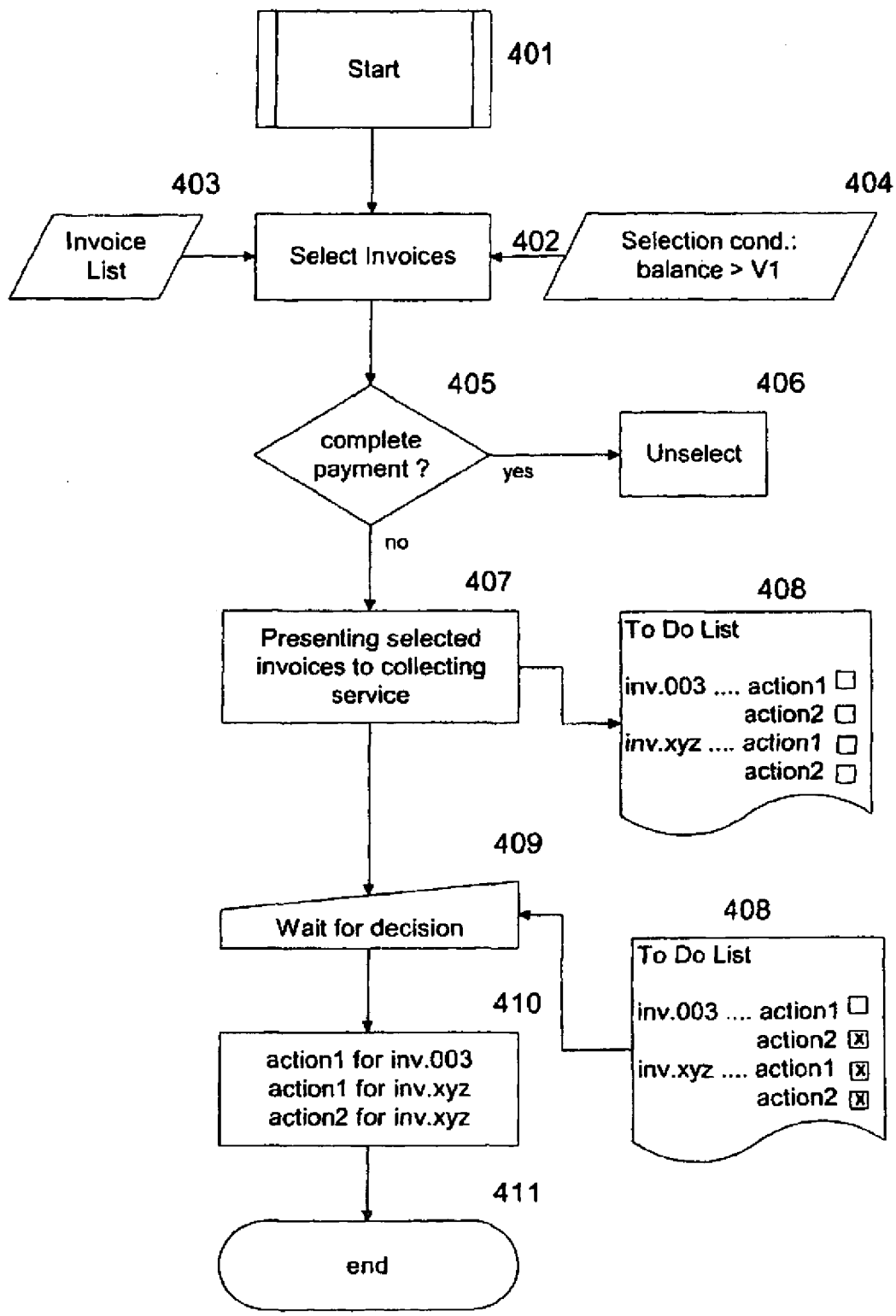
Figure 5:
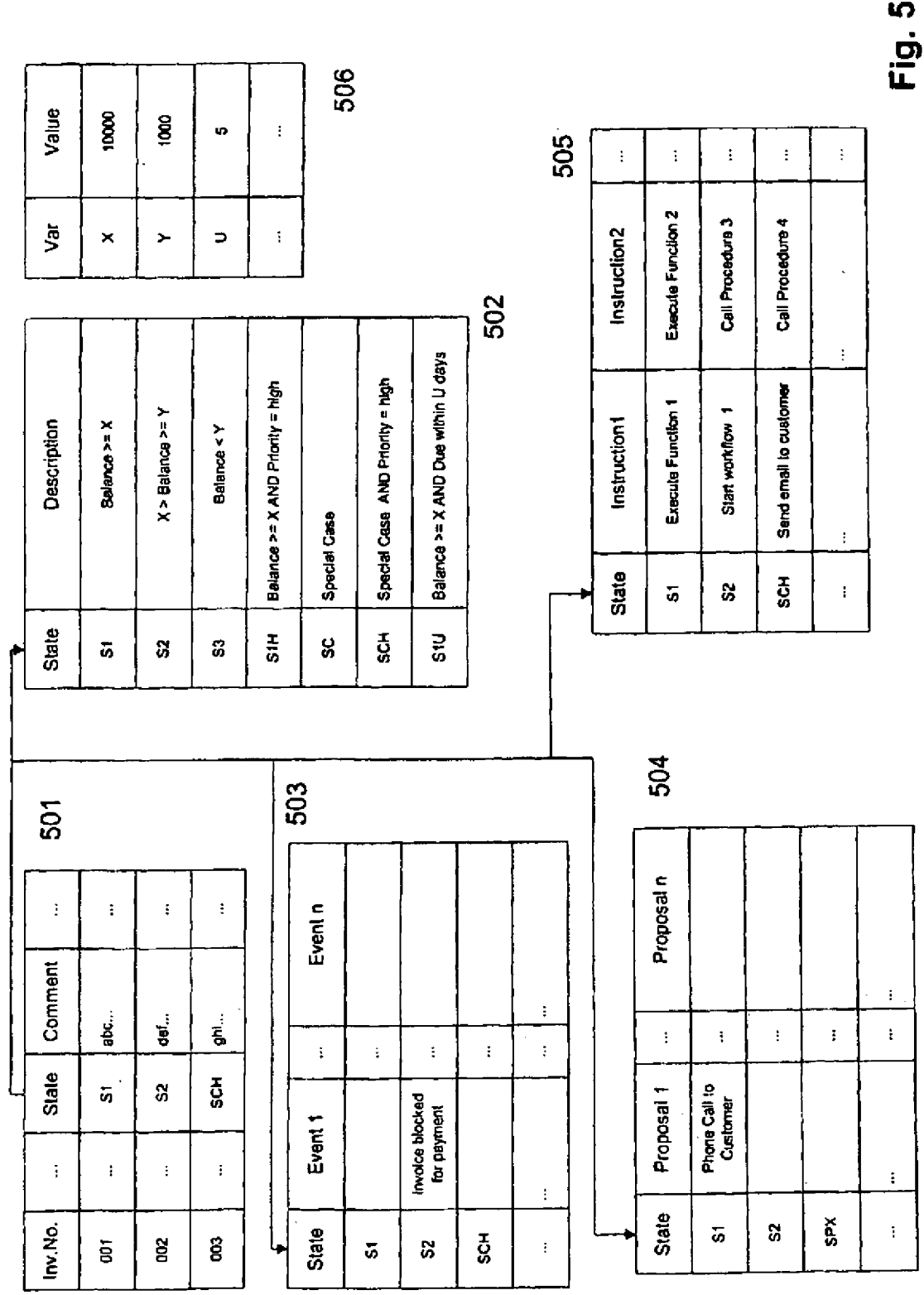

FIG. 5 depicts an illustrative data structure associated with an exemplary invoice, according to one or more embodiments of the present invention. The data structure can be implemented as a table 501 having a plurality of columns, or fields. According to such embodiments of the invention, a column for the state of the invoice can be included. The individual data records of the invoices are also implemented as individual lines, or rows, of table 501. The state column of table 501 comprises one or more state fields for each invoice. In a table 502, a description can be assigned to a state. By means of table 503, one or more events 1 to n can be assigned to a state. By means of table 504, one or more proposals 1 to n can be assigned to a state. By means of table 505, one or more events 1 to n can be assigned to a state. Additionally, tables 502 to 505 can be linked to table 501 by the state column. In table 506, values of variables may be stored. The conditions that are applied when querying the list of invoices may be stored in a table as well (not shown).

Modifications and adaptations of the present invention will be apparent to those skilled in the art from consideration of the specification and practice of the invention disclosed herein. The foregoing description of an implementation of the invention has been presented for purposes of illustration and description. It is not exhaustive and does not limit the invention to the precise form or forms disclosed. Modifications and variations are possible in light of the above teachings or may be acquired from the practicing of the invention. For example, the described implementation includes software, but systems and methods consistent with the present invention may be implemented as a combination of hardware and software or in hardware alone. Additionally, although aspects of the present invention are described for being stored in memory, one skilled in the art will appreciate that these aspects can also be stored on other types of computer-readable media, such as secondary storage devices, for example, hard disks, floppy disks, or CD-ROM; the Internet or other propagation medium; or other forms of RAM or ROM.

Computer programs based on the written description and flow charts of this invention are within the skill of an experienced developer. The various programs or program modules can be created using any of the techniques known to one skilled in the art or can be designed in connection with existing software. For example, programs or program modules can be designed in or by means of Java, C++, HTML, XML, or HTML with included Java applets or in SAP R/3 or ABAP. One or more of such modules can be integrated in existing e-mail or browser software.

While illustrative embodiments of the invention have been described herein, the present invention is not limited to these various embodiments, but includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive.

Means-plus-function or step-plus-function limitations will only be employed where for a specific claim limitation all of the following conditions are present in that limitation: a) "means for" or "step for" is expressly recited; b) a corre-

What is claimed is:

1. A filter for isolating a two-phase AC power supply form at least 2 kV p-p of power of an HF frequency that is reactively coupled to a resistive heating element, while conducting several kW or 60 Hz AC power from said two-phase AC power supply to the resistive heating element without overheating, said two-phase AC power supply having a pair of terminals and said resistive heating element having a pair of terminals, said filter comprising:
   a pair of cylindrical non-conductive envelopes each having an interior diameter between about one an two inches;
   respective pluralities of used iron powder toroids of magnetic permeability on the order of about   stacked coaxially within respective ones of said pair of cylindrical envelopes, the exterior diameter of said toroids being about the same as said interior diameter of each of said envelopes; and
   a pair of wire conductors of diameter between 3 mm and 3.5 mm helically wound around corresponding ones of said pair of envelopes to form respective inductor winding in the range of about 16 to 24 turns for each said envelope, each of said wire conductors having an input end and an output end, the input end of each one of said wire conductors being coupled to a corresponding one of the pair of terminals of said two-phase AC power supply, and the output end of each of said wire conductors being coupled to a corresponding one of the pair of terminals of said resistive heating element; and
   a pair of capacitors connected between the input ends of respective ones of said pair of wire conductors and ground, each of said capacitors having a capacitance that forms a resonance with the inductance of the corresponding one of said inductors at a resonant frequency exceeding said HF frequency, whereby said filter presents an inductive reactive at said HF frequency and has an RF attenuation of over 60 dB at said HF frequency.

2. The filter of claim 1 wherein said HF frequency is at least 13.56 MHz, said exterior diameter of said toroids is 1.5 inches, the number of said turns is 21 for each said inductor winding, said capacitance of said capacitors is about 0.01 microFarads and said resonant frequency is 18.7 MHz.

3. The filter of claim 1 further comprising an AC line filter connected between the input ends of said wire conductors and said two-phase AC power supply.

4. The apparatus of claim 1 wherein each of said windings has a number of turns a range of 16 to 24.

5. The apparatus of claim 1 wherein each of said windings is connected to said AC power supply at one end of the winding, and wherein each of said capacitors is connected to a respective one of said windings at said one end.

6. The apparatus of claim 1 wherein said filter presents an inductive reactance at said HF frequency and has an RF attenuation of over 60 dB at said HF frequency.

7. A plasma reactor comprising:
   an electrostatic chuck (ESC) having a top insulating layer containing a chucking electrode and concentric inner and outer heater elements each having two terminals, and a conductive base below said insulating layer;
   an RF bias power generator of an HF frequency and an impedance match element, said generator being connected through said impedance match element to one of (a) said chucking electrode and (b) said conductive base;
   a pair of two-phase AC current supplies each having two terminals for providing current to corresponding ones of said inner and outer heating elements;
   a pair of filters for isolating said two-phase AC power supplies from at least 2 kV p-p if HF power that is reactively coupled to said resistive heating element from said bias power generator, while conducting several kW of 60 Hz AC power from each of said two-phase AC power supplied to respective ones of said resistive heating elements without overheating, each of said filters comprising:
   a pair of cylindrical non-conductive envelopes each having an interior diameter between about one an two inches;
   respective pluralities of fused iron powder toroids of magnetic permeability on the order of about 10 stacked coaxially within respective ones of said pair of cylindrical envelopes, the exterior diameter of said toroids being about the same as said interior diameter of each of said envelopes;
   a pair of wire conductors of diameter between 3 mm and 3.5 mm helically wound around corresponding ones of said pair of envelopes to form respective inductor windings in the range of about 16 to 24 turns for each said envelope, each of said wire conductors having an input end and an output end, the input end of each one of said wire conductors being couples to a corresponding one of the pair of terminals of the corresponding two-phase AC power supply, and the output end of each one of said wire conductors being coupled to a corresponding one of the pair of terminals of the corresponding resistive heating element; and
   a pair of capacitors connected between the input ends of respective ones of said pair of wire conductors and ground, each of said capacitors having a capacitance that forms a resonance with the inductance of the corresponding one of said inductors at a resonant frequency exceeding said HF frequency, whereby said filter presents an inductive reactance at said HF frequency and has an RF attenuation of over 60 dB at said HF frequency.

8. The plasma reactor of claim 7 wherein said HF frequency is at least 13.56 MHz, said external diameter of said toroids is 1.5 inches, the number of said turns is 21 for each said inductor winding, said capacitance of said capacitors is 0.01 microFarads and said resonant frequency is 18.7 MHz.

9. The plasma reactor of claim 7 further comprising a pair of AC line filters connected between the input ends of respective ones of said wire conductors and the terminals of respective ones of said two-phase AC power supplies.

10. In a plasma reactor having an electrostatic chuck containing an electrical heating element, a bias power generator of an HF frequency coupled to an electrode of the electrostatic chuck, and an AC power supply coupled to the electrical heating element, a filter comprising:
    a pair of cylindrical non-conductive envelopes;
    respective pluralities of magnetic toroids stacked coaxially within respective ones of said pair of cylindrical envelopes; and
    a pair of wire conductors helically wound around corresponding ones of said pair of envelopes to form respective inductor windings, each of said wire conductors being connected between said AC power supply and said resistive heating element; and a pair of capacitors connected between respective ones of said pair of wire conductors and ground, each of said capacitors having a capacitance that forms a resonance with the inductance of the corresponding one of said inductors at a resonant frequency that exceeds said HF frequency by several MHz.

11. The apparatus of claim 10 wherein each of said cylindrical nonconductive envelopes has an interior diameter between one and two inches.

12. The apparatus of claim 11 wherein said magnetic toroids comprising fused iron powder toroids of magnetic permeability on the order of 10.

13. The apparatus of claim 12 wherein each of said wire conductors is of a diameter between 3 mm and 3.5 mm.

14. The apparatus of claim 11 wherein the exterior diameter of said toroids is the same as said interior diameter of each of said envelopes.

15. The apparatus of claim 10 wherein said AC power supply has a frequency on the order of 60 Hz.

16. The method of claim 15, wherein a second period of time is smaller than the first period of time and a third period of time is smaller than the second period of time.

17. The method of claim 1, wherein, in the event of partial payment or non-payment, the presentation of the invoices to a collection agency is controlled based on whether payments according to the invoices have been made before, on or after the due date.

18. The method of claim 17, further comprising the step of:
checking whether a partial-payment or a non-payment is justified for at least one invoice, and presenting only the unjustified invoices to an external collecting agency.

19. The method of claim 18, further comprising the step of:
presenting such invoices to a clearing division prior to presenting the invoices to the external collecting agency.

20. The method of claim 17, wherein the collector is a collection division of the company or an external collecting agency.

21. The method of claim 1 is enabled by computer-readable programs of instructions that comprise enterprise resource planning software.

22. The method of claim 1 wherein the preselectable first percentage of outstanding turnover of the company is 80 percent.

23. The method of claim 1, further comprising the step of automatically invoking dependent work flow based on the state field.

24. A computer system for the computerized processing of invoices and data associated with the invoices, the computer system comprising:
memory having programs of instructions to manipulate the data;
an input component for receiving and entering the data;
an output component for sending and presenting the data;
storage means for storing the data; and
a processor responsive to the program instructions, the program instructions enabling:
assigning, for each of a plurality of invoices, a first state to a state field in an electronic data record corresponding to the invoice, wherein each state field is linked to a first table containing a description of the first state, a second table containing data assigning the first state to an event that can occur during invoice processing, a third table containing at least one state-dependent proposal for changing the first state, and a fourth table containing at least one state-dependent instruction that is automatically executable by the computer system selecting, according to the first states, at least one invoice from the plurality of invoices presented to two or more customers of a company, wherein the at least one selected invoice has a balance larger than a preselectable first percentage of outstanding turnover of the company;
determining, whether payments according to the selected invoices have been made before or at the time of selection;
presenting to a collector invoices wherein conditions of partial payment or non-payment were determined;
for each of the invoices with conditions of partial payment or non-payment, making a state-dependent proposal to the collector for changing the state of the invoice or automatically executing an instruction depending on the state of the invoice, wherein the state-dependent proposal and the state-dependent instruction are made based on data in the respective third table and fourth table of the state field of the invoice; and
periodically collecting all changes of state of all the invoices and writing the changes into the respective state fields.

25. The computer system of claim 24, wherein the selecting step further includes narrowing the selected invoices to invoices that are due within a preselectable time or on a preselectable date.

26. The computer system of claim 25, wherein the selecting from the selected invoices step further includes narrowing the selected invoices to invoices having a due date that has expired.

27. The computer system of claim 26 is enabled by computer-readable programs of instruction that comprise enterprise resource planning software.

28. The computer system of claim 25 is enabled by computer-readable programs of instruction that comprise enterprise resource planning software.

29. The computer system of claim 24, further comprising, prior to the determining step:
selecting from the selected invoices, invoices having a balance smaller than a preselectable second value and larger than a preselectable third value, wherein the second value is smaller than or equal to the first value and the third value is smaller than the second value.

30. The computer system of claim 29, wherein the selecting step further includes selecting, from the selected invoices, that are due within a preselectable time or on a preselectable date.

31. The computer system of claim 30, wherein the selected invoices are presented via a to-do list of items, wherein each item includes customizable attributes determined according to the state field of each selected invoice.

32. The computer system of claim 29, further comprising the step of:
notifying the customers of the company of unselected invoices associated with the company that are due.

33. The computer system of claim 29, wherein the preselectable first, second and third values are such that a preselectable second percentage of outstanding turnover of a company is covered.

34. The computer system of claim 29, wherein the presenting step includes presenting invoices that are not due, to the collector, at or before a presetable second period of time prior to a due date.

35. The computer system of claims 24, wherein the selected invoices are presented via a to-do list of items, wherein each item includes customizable attributes determined according to the state field of each selected invoice.

36. The computer system of claim 24, wherein the presenting step includes checking whether a partial payment or non-payment is justified for at least one invoice, and, presenting only the unjustified invoices to the collector.

37. The computer system of claim 36, wherein the collector is a collection division of the company or an external collecting agency.

38. The computer system of claim 24, wherein the presenting step includes presenting invoices that are due, to the collector, at or before a presetable first period of time prior to a due date to the collector.

39. The computer system of claim 38, wherein a second period of time is smaller than the first period of time and a third period of time is smaller than the second period of time.

40. The computer system of claim 24, wherein, in the event of partial payment or non-payment the collector controls the presentation of the invoices to a collection agency based on whether payments according to the invoices have been made before, on, or after the due date.

41. The computer system of claim 40, further comprising:
checking whether a partial-payment or a non-payment is justified for at least one invoices, and, presenting only the unjustified invoices to an external collecting agency.

42. The computer system of claim 41, further comprising:
presenting such invoices to a clearing division prior to presenting the invoices to the external collecting agency.

43. The computer system of claim 40, wherein the collector is a collection division of the company or an external collecting agency.

44. The computer system of claim 24 is enabled by computer-readable programs of instructions that comprise enterprise resource planning software.

45. A computer-readable medium comprising instructions that, when executed by a computer, cause the computer to perform a method for processing invoices, the method comprising:
assigning, for each of a plurality of invoices, a first state to a state field in an electronic data record corresponding to the invoice, wherein each state field is linked to a first table containing a description of the first state, a second table containing data assigning the first state to an event that can occur during invoice processing, a third table containing at least one state-dependent proposal for changing the first state, and a fourth table containing at least one state-dependent instruction that is automatically executable by the computer system:
selecting, according to the state, at least one invoice from the plurality of invoices presented to two or more customers of a company, wherein the at least one selected invoice has a balance larger than a preselectable first percentage of outstanding turnover of the company;
determining whether payments according to the selected invoices have been made before or at the time of selection;
presenting to a collector invoices wherein conditions of partial payment or non-payment were determined;
for each of the invoices with conditions of partial payment or non-payment, making a state-dependent proposal to the collector for changing the state of the invoice or automatically executing an instruction depending on the state of the invoice, wherein the state-dependent proposal and the state-dependent instruction are made based on data in the respective third table and fourth table of the state field of the invoice; and periodically collecting all changes of state of all the invoices and writing the changes into the respective state fields.

46. The computer-readable medium of claim 45, wherein the selecting step further includes narrowing the selected invoices to invoices that are due within a preselectable time or on a preselectable date.

47. The computer-readable medium of claim 46 comprises enterprise resource planning software.

48. The computer-readable medium of claim 45, wherein the selecting step further includes narrowing the selected invoices to invoices having a due date that has expired.

49. The computer-readable medium of claim 48 comprises enterprise resource planning software.

50. The computer-readable medium of claim 45, wherein the selected invoices are presented via a to-do list.

51. The computer-readable medium of claim 45, wherein the presenting step includes checking whether a partial-payment or non-payment is justified for at least one invoice, and presenting only the unjustified invoices to the collector.

52. The computer-readable medium of claim 51, wherein the collector is a collection division of the company or an external collecting agency.

53. The computer-readable medium of claim 45, wherein the presenting step includes presenting invoices that are not due, to the collector, at or before a presetable first period of time prior to a due date.

54. The computer-readable medium of claim 53, wherein a second period of time is smaller than the first period of time and a third period of time is smaller than the second period of time.

55. The computer-readable medium of claim 45, wherein, in the event of partial payment or non-payment, the collector controls the presentation of the invoices to a collection agency based on whether payments according to the invoices have been made before, on, or after the due date.

56. The computer-readable medium of claim 55, further comprising:
checking whether a partial-payment or a non-payment is justified for at least one invoice, and presenting only the unjustified invoices to an external collecting agency.

57. The computer-readable medium of claim 56, further comprising:
presenting such invoices to a clearing division prior to presenting the invoices to the external collecting agency.

58. The computer-readable medium of claim 55, wherein the collector is a collection division of the company or an external collecting agency.

59. The computer-readable medium of claim 45 comprises enterprise resource planning software.

* * * * *

UNITED STATES PATENT AND TRADEMARK OFFICE
CERTIFICATE OF CORRECTION

| | | |
|---|---|---|
| PATENT NO. | : 7,778,900 B2 | |
| APPLICATION NO. | : 10/938616 | |
| DATED | : August 17, 2010 | |
| INVENTOR(S) | : Soumokil | |

It is certified that error appears in the above-identified patent and that said Letters Patent is hereby corrected as shown below:

Please delete Patent 7,778,900 in its entirety and insert Patent 7,778,900 as attached.

Signed and Sealed this
Twenty-ninth Day of November, 2011

David J. Kappos
*Director of the United States Patent and Trademark Office*

(12) United States Patent
Soumokil

(10) Patent No.: US 7,778,900 B2
(45) Date of Patent: Aug. 17, 2010

(54) METHOD AND SOFTWARE APPLICATION FOR COMPUTER-AIDED CASH COLLECTION

(75) Inventor: Mike Soumokil, Vught (NL)

(73) Assignee: SAP AG, Walldorf (DE)

(*) Notice: Subject to any disclaimer, the term of this patent is extended or adjusted under 35 U.S.C. 154(b) by 1080 days.

(21) Appl. No.: 10/938,616

(22) Filed: Sep. 13, 2004

(65) Prior Publication Data
US 2005/0091158 A1 Apr. 28, 2005

Related U.S. Application Data

(60) Provisional application No. 60/512,296, filed on Oct. 16, 2003.

(51) Int. Cl.
*G06Q 40/00* (2006.01)
(52) U.S. Cl. .............. 705/35; 705/38; 705/36; 715/236
(58) Field of Classification Search .................. 705/35
See application file for complete search history.

(56) References Cited

U.S. PATENT DOCUMENTS

| | | | |
|---|---|---|---|
| 5,133,075 A * | 7/1992 | Risch | 707/201 |
| 6,199,160 B1 * | 3/2001 | Echensperger et al. | 713/100 |
| 6,424,951 B1 * | 7/2002 | Shurling et al. | 705/14 |
| 6,487,556 B1 * | 11/2002 | Downs et al. | 707/101 |
| 6,798,413 B1 * | 9/2004 | Tracey et al. | 345/440 |
| 6,928,411 B1 * | 8/2005 | Fox et al. | 705/1 |
| 6,996,542 B1 * | 2/2006 | Landry | 705/40 |
| 7,003,766 B1 * | 2/2006 | Hong | 717/144 |
| 7,191,150 B1 * | 3/2007 | Shao et al. | 705/38 |
| 7,210,106 B1 * | 4/2007 | Delnoij et al. | 715/810 |
| 7,254,558 B2 * | 8/2007 | Hinkle et al. | 705/40 |
| 7,403,923 B2 * | 7/2008 | Elliott et al. | 705/38 |
| 2001/0051914 A1 * | 12/2001 | Yoon et al. | 705/38 |
| 2002/0082990 A1 * | 6/2002 | Jones | 705/40 |
| 2003/0018634 A1 * | 1/2003 | Shringeri et al. | 707/4 |
| 2003/0130936 A1 * | 7/2003 | Reynolds | 705/38 |
| 2003/0130937 A1 * | 7/2003 | Reynolds | 705/39 |
| 2003/0135461 A1 * | 7/2003 | Brown et al. | 705/40 |
| 2003/0221165 A1 * | 11/2003 | Young et al. | 715/505 |
| 2007/0043661 A1 * | 2/2007 | Kass et al. | 705/38 |
| 2008/0010188 A1 * | 1/2008 | Beardsell et al. | 705/38 |

OTHER PUBLICATIONS

Business Policy Letter—Student Account Receivables Write-Off, Oct. 2003.(ONot.).*
Bruce Hallberg, Sherry Kinkoph; Bill Ray,—et al., Special Edition. Using Microsoft Excel 97, Bestseller Edition, Oct. 1997 (Excel97).*
University of Wisconsin Colletions and Write-offs (F39), Revised Jun. 19, 1998 (RtOff2).*
st-www.cs.illinois.edu/users/johnson/business.../fahey.html; Business Transaction Processing Systems—Position Paper. Jan. 31. 2001 (WkFlow).*
David L. March, IT-532—Systems Analysis—Oct. 2002 (FlowChart).*

* cited by examiner

*Primary Examiner* — Ella Colbert
*Assistant Examiner* — Chika Ojiaku
(74) *Attorney, Agent, or Firm* — Finnegan, Henderson, Farabow, Garrett & Dunner LLP

(57) ABSTRACT

Methods, computer systems, and computer-readable media describe the computerized processing of invoices. Invoices having a balance larger or smaller than preselectable values are selected from a plurality of invoices presented to two or more customers. It is determined whether payments according to the selected invoices have been made before or at the time of selection, and invoices that have been partially paid or not paid are automatically presented to a collector or collection specialist.

59 Claims, 5 Drawing Sheets

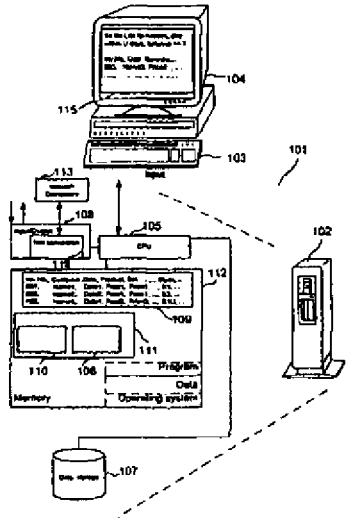

METHOD AND SOFTWARE APPLICATION FOR COMPUTER-AIDED CASH COLLECTION

RELATED APPLICATIONS

This application claims the benefit of priority under 35 U.S.C. §119(e) from U.S. Provisional Patent Application No. 60/512,296, filed Oct. 16, 2003, which is expressly incorporated herein by reference.

BACKGROUND OF THE INVENTION

This invention relates to electronic data processing and, more particularly, to methods, data structures, computer program products and systems for automated processing of invoices.

There exist many known methods and systems for electronic processing of invoices based on electronic data records. Corporations and other entities use electronic data records and enterprise business software to store the financial data related to all aspects of a company's business including, for example, sales of product, and use of such data for a variety of purposes including, for example, credit and risk management. Although such data is stored and processed electronically with many electronic accounting systems, it is often not possible to accurately tell which invoices have been paid, which are being disputed, or whether there are other issues that will prevent payment of an invoice. Consequently, any analysis of the financial situation of an enterprise based on this uncertain invoice data may be misleading and show a financial situation of the enterprise that is different from the real financial situation. Further, the enterprise may not be aware of the need to collect the cash from active debts and, even if the company is aware, it may not be clear upon which parts of the outstanding invoices the efforts of cash collecting should be focused. This is particularly a problem in instances where a large number of invoices have been sent to many customers.

Thus, there is a need for a method, software application, and/or data processing system providing a more efficient solution to the problems described above. In particular, it would be desirable to provide a software application having a mechanism for enabling better processing of invoices to make collections more easily managed according to the company's active debts from customers.

SUMMARY OF THE INVENTION

In accordance with the invention, as broadly described herein, embodiments of methods and systems consistent with the principles of the invention provide a method of computerized processing of invoices comprising steps of: selecting from a plurality of invoices presented to two or more customers, invoices having a balance larger than a preselectable first value, determining whether payments according to the selected invoices have been made before or at the time of selection, and presenting to a collector invoices wherein conditions of partial payment and non-payment have occurred.

An additional aspect of another implementation of the above method is to provide a computer system for the computerized processing of invoices, the system comprising: memory having program instructions; input means for receiving and entering data; output means for sending and presenting data; storage means for storing data; and a processor responsive to the program instructions, the program instructions enabling: selecting from a plurality of invoices presented to two or more customers, invoices having a balance larger than a preselectable first value (sometimes "step a)" as discussed below), determining whether payments according to the selected invoices have been made before or at the time of selection ("step b)"), and presenting to a collector invoices wherein conditions of partial payment and non-payment have occurred ("step c)").

Certain embodiments of the present invention facilitate the collection of outstanding cash independent of a specific customer. Using methods consistent with the present invention, a company can identify invoices most at risk for nonpayment and target such invoices for cash collection. Certain embodiments of the present invention provide an overview of critical invoices well before the respective due dates, so that measures to ensure punctual payment can be taken in good time. Further, certain embodiments of the invention may improve record keeping of outstanding day sales via management of liquidity, and credit risk management via increased transparency. Certain embodiments may also allow for better customer profiling through company-owned credit scores, better reporting of accounts receivable, and better communication with customers.

Embodiments of the invention are further directed to a computer system, a computer program, a computer-readable medium and a carrier signal, each comprising program code or instructions for computerized processing of invoices, according to the above method and related embodiments.

Such computer program can be installed as one or more programs or program modules on different hardware systems (e.g., drives, computers, computer systems, etc.), potentially run separately and independently of each other, and in their entirety being capable of performing the inventive method and its embodiments. The different systems may be connected in any variety of manners, such as via a computer network, to communicate with each other.

Additional objects and advantages of the various embodiments of the invention will be set forth in part in the description, or may be learned by practice of the invention. The objects and advantages of the embodiments of the invention will be realized and attained by means of the elements and combinations particularly pointed out in the appended claims. Embodiments of the invention are disclosed in the detailed description section and in the appended claims.

BRIEF DESCRIPTION OF THE DRAWINGS

The accompanying drawings, which are incorporated in and constitute a part of this disclosure, illustrate various embodiments and aspects of the invention. In the drawings:

FIG. 1 illustrates an exemplary implementation of a method, by means of a computer system, according to an embodiment of the present invention;

FIG. 2 illustrates a flow diagram of a first example of a method for processing invoices according to one embodiment of the principles described in this disclosure;

FIG. 3 illustrates a flow diagram of a second example of a method for processing invoices according to another embodiment of the principles described in this disclosure;

FIG. 4 illustrates a flow diagram of a third example of a method for processing invoices according to yet another embodiment of the principles described in this disclosure; and FIG. 5 illustrates a block diagram of an exemplary data structure for processing invoices according to one embodiment of the principles described in this disclosure.

DESCRIPTION OF THE EMBODIMENTS

Within the concept of this specification, the terms used shall have their usual meaning in the context of the field of data processing, unless defined otherwise herein.

A computer system broadly refers to any standalone computer such as a PC or a laptop or a series of computers connected via a network (e.g., an enterprise network within a company), or a series of computers connected via the Internet.

Computer systems and programs are closely related. As used herein, phrases, such as "the computer provides," "the program provides," "the program performs specific actions," and the like are used to express actions by a computer system that may be controlled by a program or to express that the program or program module may be designed to enable the computer system to perform the specific action or to enable a user to perform the specific action by means of a computer system.

It should be understood that the term "presentment" as used herein broadly refers to the specialized definition normally associated with commercial paper (i.e. the production on a negotiable instrument to a drawee), as well as to providing such information via electronic means (with or without the qualifier, "electronic"). For example, this electronic presentment may be through the use of an Internet-or intranet website, or via e-mail or text messaging, for example, by making a web site accessible to one or more persons. Electronic presentment may also take place by sending computer-readable storage media, like magnetic, magneto-optical or optical disks (e.g., floppy disks, storage tapes, CDs, DVDs, etc.) or other types of portable memory devices via standard mail, express courier or the like.

Reference will now be made in detail to the principles of the invention and its embodiments by an explanation of the data processing functionality, examples of which are illustrated in the accompanying drawings. Examples mentioned herein are for explanatory purpose only and are not meant to limit the invention in any manner whatsoever.

In electronic data processing, particularly in accounting processes, the content of invoices may be stored in electronic data records. Such data records may be implemented as one or more lines of one or more tables, each line having one or more fields. In object-orientated programming, for example, an electronic data record may be implemented by an instance of a class. The class can have a plurality of variables. The class can further have one or more functions, which are operable on the instances (e.g., invoices). The fields or variables contain typical invoice information such as name of customer, addresses, product, price, account number, payment terms, tax, contact person, invoice date, due date or person responsible for changes in the document on the customer side or responsible person for authorization. Of course other typical fields or variables may also be used and are intended to be within the scope of the invention.

The processes, such as those set forth herein, may be performed using such electronic data records. A set of such records may be queried, for example, to extract such records where the balance of the invoice is larger then a preselectable first value (for future reference, step a). The selected invoices may be stored as a separate set or marked as a selected set. In a further step (step b), it is determined, e.g. by the computer system, whether payments have been received for the selected invoices. Invoices for which no payments or only partial payments have been received are further selected, e.g. by storing them separately or marking them. Both steps a) and b) may be performed in reverse order or as a single query. In a third step (step c), the selected invoices with past due amounts are presented to a collector. A collector may be, for example, a caseworker of the company, an outside collection agent or agency, an electronic component responsible for collection, or a combination thereof. The term "collecting agency" broadly refers to collection divisions of the company seeking payment of invoices as well as to collecting agencies different from the company.

Presentation to the collector may be performed in a variety of ways. In one embodiment, the collector may be sent an e-mail including a file with the selected set of invoices. In certain other embodiments, the collector may be sent a link pointing to the storage location of such a file or be sent a link to a web page that contains the selected invoices and that may comprise further information like correspondence, notes, scanned letters, etc. The collector can then decide which further actions are to be performed. The collector may, for example, send an e-mail to the customer or call the customer directly via telephone. If the collector is an electronic system, the collector may automatically generate and send emails or automatically dial the customer using the telephone. If the customer is not at home, the collector may leave computerized voice messages indicating the status of the customer's invoice and requesting payment.

After presenting the selected invoices to the collector, the states of the invoices may be changed or updated accordingly. In certain embodiments, the invoice data may be updated based on information received by the collector, whether the collector is a person or an electronic system. It should also be noted that, for at least some of the embodiments described herein, the selection of invoices is independent of customer-specific information, thereby allowing customer-independent reporting.

As mentioned above, invoices may be "marked" to indicate that they are selected for further processing. In certain embodiments of the present invention, an invoice is represented by an electronic data record that may comprise a data field for such information as the amount of the balance, whether the invoice is partially paid or unpaid, a characterization of one or more of the payments, and the state of processing of the invoice. This field may be referred to as a state field. The state field may be implemented, for example, as a string field with a length of one or more characters, depending on the number of possible states. The following further states may also be characterized: cash collection, special attention, high priority, medium priority, low priority, problem indicators on contract issues or on invoice content and lay-out issues or on issues to be handled by responsible managers or on escalated matters, internal status, number of days outstanding, payment date of document. These states are examples only, as all states generally know in the art are contemplated, and are not intended to limit the scope of the invention.

A first embodiment of the inventive method is characterized in that the method further comprises in step a): selecting from the selected invoices such invoices, which are due within a preselectable time or on a preselectable date, before continuing with step b). As an example, invoices of high priority may be presented ten days before their due date, invoices of medium priority can be presented seven days before their due date, and low priority invoices can be presented on the due date. The mentioned values are examples only, specific values could be set by the company. Furthermore, instead of such priority-based ranking, the amount of the balance may be used as well.

A second embodiment of the inventive method is characterized in that the method further comprises in step a): selecting from the selected invoices such invoices, the due date of which has expired, before continuing with step b).

A third embodiment comprises, instead of or in addition to step a), step d): selecting from the plurality of invoices such invoices, the balance of which is smaller than a preselectable second value, and larger than a preselectable third value, the second value being smaller or equal than the first value and the third value being smaller than the second value, before continuing with step b).

A fourth embodiment comprises in step d): selecting from the selected invoices such invoices, which are due within a preselectable time or on a preselectable date. This is useful because it enables a company to efficiently check whether its invoices are paid in due time. For example, the collector may receive a list of invoices that are due in two days. The collector can now schedule time appropriately, because the collector knows how many and which invoices must be checked in two days.

A fifth embodiment is characterized by, instead of or in addition to step c), notifying (also dunning) the customers of the accompanying unselected due invoices. With this method, minor important invoices can be automatically processed, e.g. by automatically sending emails, personalized circular letters, and/or other mail.

A sixth embodiment is characterized by, in step c), presenting the selected invoices via a "things to do" list ("to do list").

The presentation of a to-do list may be accomplished by presenting the selected invoices in the form of a list on a display of the computer system of a caseworker. This can be done automatically or by sending a link to a file, that contains the list. The list may be provided with check boxes, alerts, or proposals for actions, each depending on the state of the respective invoice.

In a seventh embodiment, the method is characterized in that the preselectable first value is such that a preselectable first percentage of the outstanding turnover of the company is covered. The first percentage may range, for example, from approximately 70% to approximately 90%, depending on the intention or desire of the company. For example, 80% may be a useful value in a variety of cases. The actual number of the first value can, for example, be determined iteratively by successively increasing the first value from start value (0% being the trivial case) and checking within each step, which percentage of the turnover is covered, and taking that number as first value, the accompanying percentage of which equals the desired value of turnover.

An eighth embodiment is characterized in that the preselectable first, second and third values are such that a preselectable second percentage of the outstanding turnover of the company is covered. The second percentage may range, for example, from approximately 70% to approximately 100%, depending on the intention or desire of the company. The selection according to this embodiment is helps to ensure that unselected invoices represent only a comparatively small percentage (i.e., 100% minus the second percentage) of the company's turnover.

Another embodiment comprises, in step c), checking whether a partial-payment or non-payment is reasoned (or justified), and if not, presenting such unreasoned (or unjustified) partial-or non-paid invoices to a collector. After presenting the invoices to the collector, the states of the respective invoices may be changed accordingly.

A further embodiment of the inventive method comprises, in step c), presenting invoices that are not due at or before (i.e., by) a presetable first period of time prior to the due date to the collector.

A further embodiment of the inventive method comprises, in step d), presenting invoices that are not due by (i.e., at or before) a presetable second period of time prior to the due date to the collector.

A still further embodiment of the inventive method comprises, instead of or in addition to step a) and/or step d), selecting from the plurality of invoices the invoices with balances smaller than the third value.

A still further embodiment comprises, in step d), presenting the invoices at or before a presetable third period of time before the due date to the collector.

A still further embodiment comprises the collector determining whether payments according to the invoices have been made before, on or after the due date, and, in the case of a partial-or non-payment, presenting such invoices to a collector.

A still further embodiment comprises checking whether a partial-or non-payment is justified (or reasoned), and, if not, presenting such invoice to an external collecting agency.

A still further embodiment comprises presenting such invoices to a clearing division prior to presenting them to the external collecting agency. This may be useful, because it enables the company to negotiate new payment conditions with the customers before escalating the case to the collecting agency. In the event that new payment conditions have been agreed upon, the step of presenting to the collecting agency can be omitted.

The preselectable first, second and third values, times, dates and percentages can be stored in variables or tables and can be made editable by a user (e.g. a caseworker or a collector) via a user interface.

A still further embodiment of the inventive method is characterized in that the second period of time is smaller than the first period of time and the third period of time is smaller than the second period of time. In a still further embodiment, the collection agency can be a collection division of the company or an external collecting agency.

A first embodiment of the electronic data record is characterized in that the state field can contain one or more characters for the delineation or characterization of the state. The above-mentioned states may be entered into the state field by entering a characteristic character or combination characters into the field, e.g. S1 to Sn for the states 1 to n. For each condition mentioned above, a state can be assigned and entered into the state field. Likewise, a state can be assigned to combinations of two or more conditions.

A further embodiment of the electronic data record is characterized in that the data field can be linked to a table, which can contain a description of a state. For example, the following descriptions can be entered in that table: balance>=X, X>balance>=Y, high priority, special case, high priority AND balance>=X, due within U days, due on "date", and so on.

A further embodiment of the electronic data record is characterized in that the state field can be directly or indirectly linked to a table, which can contain one or more instructions, that depend on the state and which are automatically executable by a computer system, for example, automatically notifying/dunning customers.

A further embodiment of the electronic data record is characterized in that the state field can be directly or indirectly linked to a table, which contains data assigning the state to an event that might occur during the processing of the invoice. Representative events that might occur include: blocking an invoice from being paid because invoice lay-out is not complete, the invoice reference or other necessary information is missing, or quality or quantity issues on outstanding documents need to be solved by a responsible person within the company. These events are examples only and are not intended to limit the scope of this invention. By means of a table, one or more proposals for a change of the state delineation may be assigned to a state.

In a further embodiment, the electronic data record may comprise a field for comments. This field may be implemented, for example, as a string field of a length of up to 128 characters or more.

A further embodiment of the electronic data record is characterized in that the electronic data record is at least partially accessible via the Internet and wherein the content of the state field or a data field for comments is editable via the Internet. In order to achieve this, the respective data fields must be unblocked so as to allow read/write access in the computer system in which the electronic data record is processed. Other selected fields of the electronic data record, the content of which fields may be of interest for a potential Internet user, may be unblocked for read access only.

A further embodiment of the electronic data record is characterized in that the state field may be linked to a table that contains one or more state dependent proposals for changing the state. For example, if the state indicates that an invoice has to be paid in a few days, a proposed state change after the due date is that the state may be changed to "not paid". Or, for example, if a certain situation has been clarified by a phone call, the state may be changed to "will be paid with delay," to reflect the conversation with the customer.

A further embodiment of the data structures of the above-described methods is characterized in that the method further comprises a step of assigning a state, which may be entered by a user, to the state field. An independent program, which may collect all changes of states in a pre-definable time interval and then write the changes periodically into the respective state fields, may implement this assignment step.

A further embodiment of this method is characterized in that the method further comprises selecting, sorting, evaluating, or analyzing the electronic invoices according to the state.

By using this method and generally known database query tools, a user of the method (e.g. a collector) may get lists of all invoices that fulfill the various pre-definable conditions associated with the state field as indicated above.

A further embodiment comprises calling a state dependent work flow. By using this method, a workflow that is designed to solve a specific problem may be automatically initiated. For example, a dispute process can be initiated if a due invoice is not paid without a reasoned statement. Then, mail may be automatically sent to a collecting agency in order to solve the problem. Further, a deadline can be set on an outstanding problem. After the specified date, the system may automatically send a reminder to the responsible persons to take action.

Further, a to-do list can be initiated for cash collectors on outstanding items and mail may be automatically sent to responsible contact people associated with the customers.

The disclosed methods, data structures, and computer systems may be used in or for an enterprise resource planning software. Enterprise resource planning software as used herein, broadly refers to any software or software package for supporting business processes of enterprises, including but not limited to accounting, administration, management, or production processes.

Processors suitable for the execution of a computer program include, by way of example, both general and special purpose microprocessors, and any one or more processors of any kind of digital computer. Generally, a processor will receive instructions and data from a read-only memory or a random access memory, or both. The essential elements of a computer are a processor for executing instructions and one or more memory devices for storing instructions and data. Generally, a computer will also include, or be operatively coupled to receive data from or transfer data to, or both, one or more mass storage devices (storage means) for storing data, e.g., magnetic, magneto-optical, or optical disks. Information carriers suitable for embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the invention can be implemented on a computer system having a display device such as a CRT (cathode ray tube) or LCD (liquid crystal display) monitor for displaying information to the user, and a keyboard and/or a pointing device, such as a mouse or a trackball, by which the user can provide input to the computer. Other kinds of devices can be used to provide for interaction with a user as well. For example, feedback provided to the user can be any form of sensory feedback, such as visual feedback, auditory feedback, or haptic feedback; and input from the user can be received in any form, including acoustic, speech, or haptic input.

The invention is now described in more detail by way of reference to the drawings. FIG. 1 shows one example of an implementation of an embodiment of the invention: a computer system with program modules for processing the inventive electronic data record and for performing the inventive method. What is shown is a computer system 101 comprising a computer 102 having a CPU 105, a memory 112 for storing an operating system, data and programs. In memory 112, a software application 111 is stored for being processed by CPU 105. Software application 111 comprises program modules 106, 110 for carrying out the processing of the inventive electronic data record and the processing according to the inventive method. The inventive electronic data records are implemented in a table 109 comprising columns for typical invoice data and at least one column for the state of the invoice. Table 109 is stored in computer memory 112 and/or on a data storage device 107. Computer system 101 further comprises input means 103, output means 104 for interaction with a user (e.g., for starting the program modules and/or for data input), and general input/output means 108, including a network connection 114 (e.g., wired, wireless, optical, etc.), for sending and receiving data. A plurality of computer systems 101 can be connected via the network connection 114 in the form of a network 113. In this case, the network computers 113 can be used as further input/output means, including the use as further storage locations. Computer system 101 further comprises storage means 107.

If software application 111 carries out the claimed method, CPU 105 may process program modules 106, 110. The processing comprises module 106 querying table 109 for invoices, which are due within U days and the balance of which is equal or greater than X. Module 106 enters a state S1U into the state field of the respective invoice(s), Inv. No. 3 in the example. Subsequently, module 110 queries table 109 for invoices having the state S1U, extracts preselectable data from the respective invoices, and presents the extracted data to a user in the form of a to-do-list 115 on a display 104. A user can evaluate the list and decide which actions should be performed next. In order to support this, the to-do-list may comprise check boxes or buttons by means of which further actions can be initiated. For example, a button assigned to each invoice may cause, when pressed or selected, an e-mail with a predefinable content to be sent to the customer of the respective invoice. The presenting of the to-do list can also be performed on other network computers 113 or the output means 104.

FIG. 2 shows an exemplary flow diagram illustrating principles of the disclosed methods, according to one or more embodiments of the present invention. After a start step 201, a list of invoices 203 is queried or selected in step 202 according to a set of selection conditions 204. In the illustrated example, the set consists of only one condition: The balance of an invoice has to be greater than a value V1. For the selected invoices, a further step 205 checks whether a payment (e.g., full payment) has been received. If complete payment has been received, the respective invoice is withdrawn from the list of selected invoices. In a further step, the state of the respective invoice may be changed to "paid". The invoices for which no payment or only a partial payment has been received are then presented as a to-do list 208 to a collector, e.g. a user in a collecting department of the company, as shown in step 207. This exemplary process then ends in step 209.

FIG. 3 shows a further exemplary flow diagram in order to further illustrate principles of the described method, according to one or more embodiments of the present invention. After a start step 301, a list of invoices 303 is queried in step 302 according to a set of selection conditions 304. In this example, the set consists of two conditions: first, the balance of an invoice must be smaller than a value Z, and, second, the invoice has to be due. The selected invoices are checked in step 305 to see whether full payment has been received. If so, the respective paid invoice can be withdrawn (or unselected) from the list of selected invoices by, for example, changing the state of the respective invoice to "paid". The customers associated with the invoices for which no payment or only a partial payment has been received are then automatically notified/dunned in step 307 (e.g., by automatically sending dunning letters or e-mails). Alternatively, the unsettled invoices may be presented as a to-do list 208 to a collector (e.g., a user in a collecting department of the company in order to confirm the dunning by the collector before the dunning letter or e-mail is sent out). This exemplary process then ends in step 3081

FIG. 4 shows an exemplary flow diagram that further illustrates principles of the described method, according to one or more embodiments of the present invention. After initiating the process in a start step 401, a list of invoices 403 is queried in step 402 according to a set of selection conditions 404. In the instant example, the set consists of only one condition: The balance of an invoice must be greater than a value V1. The selected invoices are checked in step 405 to see whether a full payment has been received. If so, the respective paid invoice can be withdrawn (or unselected) from the list of selected invoices by, for example, changing the state of the respective invoice to "paid". The invoices for which no payment or only a partial payment has been received are then presented as a to-do list 408 to a collector (e.g., a user in a collecting department of the company) in step 407. The collector can then decide which action has to taken next, for example, by selecting one of a list of proposed actions, which can be incorporated into the to-do list 408. In step 409, the process waits for that decision. The decided action is then automatically carried out in step 410. An example for such an action is: presenting the invoice to a in-house clearing division that could, for example, decide whether to present it to an external collecting agency. The exemplary process then ends in step 411.

FIG. 5 depicts an illustrative data structure associated with an exemplary invoice, according to one or more embodiments of the present invention. The data structure can be implemented as a table 501 having a plurality of columns, or fields. According to such embodiments of the invention, a column for the state of the invoice can be included. The individual data records of the invoices are also implemented as individual lines, or rows, of table 501. The state column of table 501 comprises one or more state fields for each invoice. In a table 502, a description can be assigned to a state. By means of table 503, one or more events 1 to n can be assigned to a state. By means of table 504, one or more proposals 1 to n can be assigned to a state. By means of table 505, one or more events 1 to n can be assigned to a state. Additionally, tables 502 to 505 can be linked to table 501 by the state column. In table 506, values of variables may be stored. The conditions that are applied when querying the list of invoices may be stored in a table as well (not shown).

Modifications and adaptations of the present invention will be apparent to those skilled in the art from consideration of the specification and practice of the invention disclosed herein. The foregoing description of an implementation of the invention has been presented for purposes of illustration and description. It is not exhaustive and does not limit the invention to the precise form or forms disclosed. Modifications and variations are possible in light of the above teachings or may be acquired from the practicing of the invention. For example, the described implementation includes software, but systems and methods consistent with the present invention may be implemented as a combination of hardware and software or in hardware alone. Additionally, although aspects of the present invention are described for being stored in memory, one skilled in the art will appreciate that these aspects can also be stored on other types of computer-readable media, such as secondary storage devices, for example, hard disks, floppy disks, or CD-ROM; the Internet or other propagation medium; or other forms of RAM or ROM.

Computer programs based on the written description and flow charts of this invention are within the skill of an experienced developer. The various programs or program modules can be created using any of the techniques known to one skilled in the art or can be designed in connection with existing software. For example, programs or program modules can be designed in or by means of Java, C++, HTML, XML, or HTML with included Java applets or in SAP R/3 or ABAP. One or more of such modules can be integrated in existing e-mail or browser software.

While illustrative embodiments of the invention have been described herein, the present invention is not limited to these various embodiments, but includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive.

Means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for computerized processing of invoices, the method capable of being performed by a computer system with a memory having memory instructions, the method comprising the steps of:
assigning, for each of a plurality of invoices, a first state to a state field in an electronic data record corresponding to the invoice, wherein each state field is linked to a first table containing a description of the first state, a second table containing data assigning the first state to an event that can occur during invoice processing, a third table containing at least one state-dependent proposal for changing the first state, and a fourth table containing at least one state-dependent instruction that is automatically executable by the computer system;
selecting, according to the first states, at least one invoice from the plurality of invoices presented to two or more customers of a company, wherein the at least one selected invoices has a balance larger than a preselectable first percentage of outstanding turnover of the company;
determining whether payments according to the selected invoices have been made before or at the time of the selection;
presenting to a collector invoices wherein conditions of partial payment or non-payment were determined;
for each of the invoices with conditions of partial payment or non-payment, making a state-dependent proposal to the collector for changing the state of the invoice or automatically executing an instruction depending on the state of the invoice, wherein the state-dependent proposal and the state-dependent instruction are made based on data in the respective third table and fourth table of the state field of the invoice; and
periodically collecting all changes of state of all the invoices and writing the changes into the respective state fields.

2. The method of claim 1, wherein the selecting step further includes narrowing the selected invoices to invoices that are due within a preselectable time or on a preselectable date.

3. The method of claim 1, wherein the selecting step further includes narrowing the selected invoices to invoices having a due date that has expired.

4. The method of claim 1, further comprising, prior to the determining step:
selecting from the selected invoices, invoices having a balance smaller than a preselectable second value and larger than a preselectable third value, wherein the second value is smaller than or equal to the first value and the third value is smaller than the second value.

5. The method of claim 4, wherein the selecting step further includes selecting, from the selected invoices, that are due within a preselectable time or on a preselectable date.

6. The method of claim 4, further comprising the step of:
notifying the customers of the company of unselected invoices associated with the company that are due.

7. The method of claim 1, wherein the selected invoices are presented via a to-do list of items, wherein each item includes customizable attributes determined according to the state field of each selected invoice.

8. The method of claim 5, wherein the selected invoices are presented via a to-do list of items, wherein each item includes customizable attributes determined according to the state field of each selected invoice.

9. The method of claim 4, wherein the preselectable first, second and third values are such that a preselectable second percentage of outstanding turnover of a company is covered.

10. The method of claim 1, wherein the presenting step includes checking whether a partial payment or non-payment is justified for at least one invoice, and presenting only the unjustified invoices to the collector.

11. The method of claim 1, wherein the presenting step includes presenting invoices that are not due, to the collector, at or before a presetable first period of time prior to a due date.

12. The method of claim 4, wherein the presenting step includes presenting invoices that are not due, to the collector, at or before a presetable second period of time prior to a due date.

13. The method of claim 1, wherein, in the event of partial payment or non-payment, the presentation of the invoices to a collection agency is controlled based on whether payments according to the invoices have been made before, on or after the due date.

14. The method of claim 13, further comprising the step of:
checking whether a partial-payment or a non-payment is justified for at least one invoice, and presenting only the unjustified invoices to an external collecting agency.

15. The method of claim 11, wherein a second period of time is smaller than the first period of time and a third period of time is smaller than the second period of time.

16. The method of claim 10, wherein the collector is a collection division of the company or an external collecting agency.

17. The method of claim 13, wherein the collector is a collection division of the company or an external collecting agency.

18. The method of claim 14, further comprising the step of:
presenting such invoices to a clearing division prior to presenting the invoices to the external collecting agency.

19. The method of claim 1 is enabled by computer-readable programs of instructions that comprise enterprise resource planning software.

20. The method of claim 2 is enabled by computer-readable programs of instruction that comprise enterprise resource planning software.

21. The method of claim 3 is enabled by computer-readable programs of instruction that comprise enterprise resource planning software.

22. A computer system for the computerized processing of invoices and data associated with the invoices, the computer system comprising:
memory having programs of instructions to manipulate the data;
an input component for receiving and entering the data;
an output component for sending and presenting the data;
storage means for storing the data; and
a processor responsive to the program instructions, the program instructions enabling:
assigning, for each of a plurality of invoices, a first state to a state field in an electronic data record corresponding to the invoice, wherein each state field is linked to a first table containing a description of the first state, a second table containing data assigning the first state to an event that can occur during invoice processing, a third table containing at least one state-dependent proposal for changing the first state, and a fourth table containing at least one state-dependent instruction that is automatically executable by the computer system
selecting, according to the first states, at least one invoice from the plurality of invoices presented to two or more customers of a company, wherein the at least one selected invoice has a balance larger than a preselectable first percentage of outstanding turnover of the company;

determining, whether payments according to the selected invoices have been made before or at the time of selection;

presenting to a collector invoices wherein conditions of partial payment or non-payment were determined;

for each of the invoices with conditions of partial payment or non-payment, making a state-dependent proposal to the collector for changing the state of the invoice or automatically executing an instruction depending on the state of the invoice, wherein the state-dependent proposal and the state-dependent instruction are made based on data in the respective third table and fourth table of the state field of the invoice; and periodically collecting all changes of state of all the invoices and writing the changes into the respective state fields.

23. The computer system of claim 22, wherein the selecting step further includes narrowing the selected invoices to invoices that are due within a preselectable time or on a preselectable date.

24. The computer system of claim 23, wherein the selecting from the selected invoices step further includes narrowing the selected invoices to invoices having a due date that has expired.

25. The computer system of claim 22, further comprising, prior to the determining step:

selecting from the selected invoices, invoices having a balance smaller than a preselectable second value and larger than a preselectable third value, wherein the second value is smaller than or equal to the first value and the third value is smaller than the second value.

26. The computer system of claim 25, wherein the selecting step further includes selecting, from the selected invoices, that are due within a preselectable time or on a preselectable date.

27. The computer system of claim 25, further comprising the step of:

notifying the customers of the company of unselected invoices associated with the company that are due.

28. The computer system of claims 22, wherein the selected invoices are presented via a to-do list of items, wherein each item includes customizable attributes determined according to the state field of each selected invoice.

29. The computer system of claim 26, wherein the selected invoices are presented via a to-do list of items, wherein each item includes customizable attributes determined according to the state field of each selected invoice.

30. The computer system of claim 25, wherein the preselectable first, second and third values are such that a preselectable second percentage of outstanding turnover of a company is covered.

31. The computer system of claim 22, wherein the presenting step includes checking whether a partial payment or non-payment is justified for at least one invoice, and, presenting only the unjustified invoices to the collector.

32. The computer system of claim 22, wherein the presenting step includes presenting invoices that are due, to the collector, at or before a presetable first period of time prior to a due date to the collector.

33. The computer system of claim 25, wherein the presenting step includes presenting invoices that are not due, to the collector, at or before a presetable second period of time prior to a due date.

34. The computer system of claim 22, wherein, in the event of partial payment or non-payment the collector controls the presentation of the invoices to a collection agency based on whether payments according to the invoices have been made before, on, or after the due date.

35. The computer system of claim 34, further comprising: checking whether a partial-payment or a non-payment is justified for at least one invoices, and, presenting only the unjustified invoices to an external collecting agency.

36. The computer system of claim 32, wherein a second period of time is smaller than the first period of time and a third period of time is smaller than the second period of time.

37. The computer system of claim 31, wherein the collector is a collection division of the company or an external collecting agency.

38. The computer system of claim 34, wherein the collector is a collection division of the company or an external collecting agency.

39. The computer system of claim 35, further comprising: presenting such invoices to a clearing division prior to presenting the invoices to the external collecting agency.

40. The computer system of claim 22 is enabled by computer-readable programs of instructions that comprise enterprise resource planning software.

41. The computer system of claim 23 is enabled by computer-readable programs of instruction that comprise enterprise resource planning software.

42. The computer system of claim 24 is enabled by computer-readable programs of instruction that comprise enterprise resource planning software.

43. A computer-readable medium comprising instructions that, when executed by a computer, cause the computer to perform a method for processing invoices, the method comprising:

assigning, for each of a plurality of invoices, a first state to a state field in an electronic data record corresponding to the invoice, wherein each state field is linked to a first table containing a description of the first state, a second table containing data assigning the first state to an event that can occur during invoice processing, a third table containing at least one state-dependent proposal for changing the first state, and a fourth table containing at least one state-dependent instruction that is automatically executable by the computer system;

selecting, according to the state, at least one invoice from the plurality of invoices presented to two or more customers of a company, wherein the at least one selected invoice has a balance larger than a preselectable first percentage of outstanding turnover of the company;

determining whether payments according to the selected invoices have been made before or at the time of selection;

presenting to a collector invoices wherein conditions of partial payment or non-payment were determined;

for each of the invoices with conditions of partial payment or non-payment, making a state-dependent proposal to the collector for changing the state of the invoice or automatically executing an instruction depending on the state of the invoice, wherein the state-dependent proposal and the state-dependent instruction are made based on data in the respective third table and fourth table of the state field of the invoice; and periodically collecting all changes of state of all the invoices and writing the changes into the respective state fields.

44. The computer-readable medium of claim 43, wherein the selecting step further includes narrowing the selected invoices to invoices that are due within a preselectable time or on a preselectable date.

45. The computer-readable medium of claim 43, wherein the selecting step further includes narrowing the selected invoices to invoices having a due date that has expired.

46. The computer-readable medium of claim 43, wherein the selected invoices are presented via a to-do list.

47. The computer-readable medium of claim 43, wherein the presenting step includes checking whether a partial-payment or non-payment is justified for at least one invoice, and presenting only the unjustified invoices to the collector.

48. The computer-readable medium of claim 43, wherein the presenting step includes presenting invoices that are not due, to the collector, at or before a presetable first period of time prior to a due date.

49. The computer-readable medium of claim 43, wherein, in the event of partial payment or non-payment, the collector controls the presentation of the invoices to a collection agency based on whether payments according to the invoices have been made before, on, or after the due date.

50. The computer-readable medium of claim 49, further comprising:
checking whether a partial-payment or a non-payment is justified for at least one invoice, and presenting only the unjustified invoices to an external collecting agency.

51. The computer-readable medium of claim 48, wherein a second period of time is smaller than the first period of time and a third period of time is smaller than the second period of time.

52. The computer-readable medium of claim 47, wherein the collector is a collection division of the company or an external collecting agency.

53. The computer-readable medium of claim 49, wherein the collector is a collection division of the company or an external collecting agency.

54. The computer-readable medium of claim 50, further comprising:
presenting such invoices to a clearing division prior to presenting the invoices to the external collecting agency.

55. The computer-readable medium of claim 43 comprises enterprise resource planning software.

56. The computer-readable medium of claim 44 comprises enterprise resource planning software.

57. The computer-readable medium of claim 45 comprises enterprise resource planning software.

58. The method of claim 1, wherein the preselectable first percentage of outstanding turnover of the company is 80 percent.

59. The method of claim 1, further comprising the step of automatically invoking dependent work flow based on the state field.

* * * * *